(12) United States Patent
Reed et al.

(10) Patent No.: US 7,666,943 B2
(45) Date of Patent: *Feb. 23, 2010

(54) FLAME RETARDED FIBERS AND FILAMENTS AND PROCESS OF PRODUCTION THEREFOR

(75) Inventors: Jon Shannon Reed, Baton Rouge, LA (US); Daniel A. De Schryver, Bonheiden (BE)

(73) Assignee: Albemarle Corporation, Richmond, VA (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/490,300

(22) Filed: Jul. 20, 2006

(65) Prior Publication Data

US 2007/0021562 A1    Jan. 25, 2007

Related U.S. Application Data

(63) Continuation-in-part of application No. 10/762,787, filed on Jan. 21, 2004, now abandoned.

(51) Int. Cl.
*C08L 67/02* (2006.01)
(52) U.S. Cl. ...................... 525/165; 525/177
(58) Field of Classification Search ................ 525/165, 525/177
See application file for complete search history.

(56) References Cited

U.S. PATENT DOCUMENTS

| | | | |
|---|---|---|---|
| 3,474,067 A | 10/1969 | Praetzel et al. | |
| 3,975,354 A | 8/1976 | Buxbaum et al. | |
| 4,151,223 A | 4/1979 | Neuberg et al. | |
| 4,442,273 A | 4/1984 | Neiditch et al. | |
| 4,774,044 A | 9/1988 | Cline et al. | |
| 4,879,353 A | 11/1989 | Sanders et al. | |
| 4,883,846 A | 11/1989 | Moore et al. | |
| 5,066,752 A | 11/1991 | Favstritsky et al. | |
| 5,100,986 A | 3/1992 | Favstritsky et al. | |
| 5,380,802 A | 1/1995 | Termine et al. | |
| 5,409,980 A | 4/1995 | Myszak, Jr. | |
| 5,464,694 A | 11/1995 | Heinrich | |
| 5,658,662 A | 8/1997 | Leumer | |
| 5,677,390 A | 10/1997 | Dadgar et al. | |
| 5,686,538 A | 11/1997 | Balhoff et al. | |
| 5,717,040 A | 2/1998 | Brandstetter et al. | |
| 5,767,203 A | 6/1998 | Ao et al. | |
| 5,811,040 A * | 9/1998 | Mallonee ..................... | 264/78 |
| 5,852,131 A | 12/1998 | Balhoff et al. | |
| 5,902,865 A | 5/1999 | Gausepohl et al. | |
| 5,916,978 A | 6/1999 | Ao et al. | |
| 6,190,581 B1 | 2/2001 | Duffin, Jr. et al. | |
| 6,207,765 B1 | 3/2001 | Ao et al. | |
| 6,297,178 B1 | 10/2001 | Berbner et al. | |
| 6,521,714 B2 | 2/2003 | Kolich et al. | |
| 2002/0061983 A1 | 5/2002 | Kolich et al. | |
| 2005/0137311 A1 | 6/2005 | Muylem et al. | |
| 2005/0159552 A1 | 7/2005 | Reed et al. | |
| 2007/0021562 A1 | 1/2007 | Reed et al. | |

FOREIGN PATENT DOCUMENTS

| | | |
|---|---|---|
| DE | 1570395 | 10/1965 |
| DE | 1570398 | 9/1969 |
| DE | 3337223 | 5/1985 |
| EP | 0201411 A2 | 11/1986 |
| EP | 0410301 | 1/1991 |
| IL | 108960 | 8/1998 |
| JP | 47004751 | 2/1972 |
| JP | 51047044 | 4/1976 |
| JP | 59-102903 | 6/1984 |
| JP | 02-215807 | 8/1990 |
| JP | 04180966 | 6/1992 |
| JP | 05-239326 | 9/1993 |
| JP | 06-322022 | 11/1994 |
| JP | 06-322023 | 11/1994 |
| JP | 07-018165 | 1/1995 |
| JP | 07-126320 | 5/1995 |
| JP | 07-126463 | 5/1995 |
| JP | 08-188622 | 7/1996 |
| JP | 09-221574 | 6/1997 |
| JP | 09-227625 | 9/1997 |
| JP | 10-158327 | 6/1998 |
| JP | 11-043511 | 2/1999 |
| JP | 2000-248018 | 9/2000 |
| JP | 2000-281800 | 10/2000 |
| WO | WO 93/09169 | 5/1993 |
| WO | WO 2004/003071 | 1/2004 |
| WO | WO 2005/118245 | 12/2005 |

OTHER PUBLICATIONS

Gill, J.C., et al., "Brominated Polystyrene Flame Retardants: A Step Forward," Plastics Compounding, Sep./Oct. 1989, ppg 77-81.
Albemarle Brochure, SAYTEX HP-3010 Flame Retardant; 2003, 2 pages.
Albemarle Brochure, SAYTEX HP-7010P/HP-7010G Flame Retardant; 2003, 2 pages.
Author unknown, "DSBG—Caring For Your Future Today," DSBG Flame Retardants website, <http://www.dsbgfr.com/ site/EN/dsbg. asp?PI=110>; website visited Nov. 16, 2004.
Trevira CS Brochure, "Fabrics For Greater Safety in the Contract Sector" Trevira: The Fiber Company. Printed from website, <www.treviracs.com>: Jan. 2004, 8 pages.
Trevira CS Brochure, "International Fire Safety Standards" Trevira: The Fiber Company. Printed from website, <www.treviracs.com>; Jan. 2004, 2 pages.
US 5,695,691, 12/1997, McLaughlin et al. (withdrawn)

\* cited by examiner

*Primary Examiner*—Bernard Lipman
(74) *Attorney, Agent, or Firm*—Jeremy J. Kliebert

(57) ABSTRACT

A fiber or filament which is formed from ingredients comprising (a) at least one fiber-forming thermoplastic polymer, and (b) at least one polybrominated anionic styrenic polymer is provided. The polybrominated anionic styrenic polymer has a bromine content of at least about 50 wt %. When the fiber-forming thermoplastic polymer is a polyester, the polybrominated anionic styrenic polymer is present in a flame resistant or flame retardant amount. When the fiber-forming thermoplastic polymer is a polyamide, the polybrominated anionic styrenic polymer is at least about 2 wt % of the fiber or filament. When the fiber-forming thermoplastic polymer is a polyolefin, at least one synergist is present and the polybrominated anionic styrenic polymer is no more than about 15 wt % of the fiber or filament.

38 Claims, No Drawings

FLAME RETARDED FIBERS AND FILAMENTS AND PROCESS OF PRODUCTION THEREFOR

REFERENCE TO RELATED APPLICATION

This application is a Continuation-in-Part of commonly-owned prior U.S. application Ser No. 10/762,787, filed Jan. 21, 2004 now abandoned, published as U.S. Patent Publication No. 2005/0159552, now abandoned.

TECHNICAL FIELD

This invention relates to thermoplastic fibers and filaments, including those where the thermoplastic is a polyester, polyamide, polyolefin, or an acrylic, which are flame-retarded with a brominated styrenic polymer.

BACKGROUND

Although synthetic fiber materials possess a variety of excellent physical and chemical properties, a common drawback is their ready tendency to combustion, for which reason such synthetic fiber materials have traditionally been subjected to finishing treatment for flame retardancy. Examples of finishing treatment methods include dip coating and spray coating. An obvious disadvantage of coatings is that they can wear off over time.

Unfortunately, the use of flame retardant additives in synthetic fiber materials can result in undesirable color development or blooming. In other words, such additives can detrimentally affect the color of the synthetic fiber. In many applications, this color development problem is undesirable or unacceptable.

Furthermore, when blended with synthetic fiber materials, flame retardant additives tend to form nonuniform distributions in the mixture, and thus result in nonhomogeneous flame-retarded fibers, which have poor mechanical properties. The problems associated with nonhomogeneity are more pronounced for finer fibers. Specifically, if the flame retardant additive is not completely mixed with the synthetic fiber material prior to extrusion, the flame retardant additive tends to agglomerate onto itself, producing lumps in the extrusion melt, clogging the spinneret filters or orifices, or producing weak spots in the resulting continuous filament. Such agglomerated lumps also necessarily produce other areas in which there will be a lack of flame retardant additive, and thus reduced flame retardant effectiveness.

In particular, brominated polystyrenes have oftentimes been deficient in their color characteristics. Manufacturers of products containing flame retardants generally find it advantageous to have available a flame retardant which will not contribute excessive color to the products or otherwise interfere with color matching specifications applicable to a given product. Thus in general, the lower the color of the brominated styrenic polymer (i.e., the whiter the flame retardant), the better. However, high-melting flame retardants that are white often end up acting as a white pigment in the fiber, making coloring the fibers more difficult, as the white color of the flame retardant must be overcome.

Additionally, relatively few flame retardants work well with polyamides (nylons), at least in part because polyamides are high-melting. Upon oven aging for one week at 180° C., blends of polyamide with a flame retardant tend to develop color.

It would be of considerable advantage if a way of forming more uniform mixtures of flame retardants and fiber-forming thermoplastic polymers could be found, such that more homogeneous fibers may be formed. It would be additionally advantageous if the flame retardants used in such mixtures exhibited minimal color development, and at the same time did not act as a white pigment.

SUMMARY OF THE INVENTION

Polybrominated anionic styrenic polymers are compatible with, and provide flame retardancy or at least greater flame resistance to, fiber-forming thermoplastic polymers. Such flame retardants have lower viscosities and greater thermal stability than polybrominated non-anionic styrenic polymers, an advantage in processes such as melt blending and fiber spinning. Due to their compatibility with fiber-forming thermoplastic polymers, the introduction of polybrominated anionic styrenic polymers at the formation stage of fibers and filaments eliminates the need for later processing to flame retard a fabric, and the flame retardancy imparted by the intimate mixture of the polybrominated anionic styrenic polymer with a fiber-forming thermoplastic polymer is expected to be relatively permanent, unlike a coating.

Further, polybrominated anionic styrenic polymers generally form relatively uniform mixtures and thus result in more homogeneous fibers. Because of the greater homogeneity, it is also possible to obtain finer (thinner) fibers which contain a flame retardant and still retain good mechanical properties. Other advantages of the greater homogeneity are that the mixtures are far less likely to clog spinneret orifices, and the produced fibers or filaments will have few areas in which the flame retardant is absent.

In addition, polybrominated anionic styrenic polymers have been found to exhibit minimal color development. In particular, the use of a polybrominated anionic styrenic polymer with a polyamide enables a reduction of color formation.

These desirable properties of polybrominated anionic styrenic polymers are present even when the bromine content of the anionic styrenic polymer is 67 wt % or more. Further, these polybrominated anionic styrenic polymers release minimal amounts of hydrogen halide under thermal processing conditions, thereby greatly reducing the opportunity for corrosion of processing equipment to occur during polymer processing operations.

One embodiment of the invention is a fiber or filament formed from ingredients comprising (a) at least one fiber-forming thermoplastic polymer, and (b) at least one polybrominated anionic styrenic polymer. The polybrominated anionic styrenic polymer has a bromine content of at least about 50 wt %. When the fiber-forming thermoplastic polymer is a polyester, the polybrominated anionic styrenic polymer is present in a flame resistant or flame retardant amount. When the fiber-forming thermoplastic polymer is a polyamide, the polybrominated anionic styrenic polymer is at least about 2 wt % of the fiber or filament. When the fiber-forming thermoplastic polymer is a polyolefin, at least one synergist is present and the polybrominated anionic styrenic polymer is no more than about 15 wt % of the fiber or filament.

Another embodiment of the invention is a process for producing a fiber or filament, which process comprises melt spinning (a) at least one fiber-forming thermoplastic polymer, and (b) at least one polybrominated anionic styrenic polymer. The polybrominated anionic styrenic polymer has a bromine content of at least about 50 wt %. The fiber-forming thermoplastic polymer and polybrominated anionic styrenic polymer are in proportions such that when the fiber-forming thermoplastic polymer is a polyester, the polybrominated anionic styrenic polymer is present in a flame resistant or flame retardant amount, when the fiber-forming thermoplastic polymer is a polyamide, the polybrominated anionic styrenic polymer is at least about 2 wt % of the fiber or filament, and when the fiber-forming thermoplastic polymer is a polyolefin, at least one synergist is present and the polybrominated anionic styrenic polymer is no more than about 15 wt % of the fiber or filament.

Still another embodiment of the invention is a composition which is a carrier blend. The blend is formed from ingredients comprising (i) at least one polybrominated anionic styrenic polymer, wherein the polybrominated anionic styrenic polymer has a bromine content of at least about 50 wt %, and (ii) at least one synergist or at least one other flame retardant.

The flame retardants, the polybrominated anionic styrenic polymers used in this invention, are brominated styrenic polymers, preferably a brominated anionic polystyrene. These polybrominated anionic styrenic polymers have a bromine content of at least about 50 wt %, preferably at least about 60 wt %, and more preferably at least about 67 wt %. All wt % and ppm levels in reference to the polybrominated anionic styrenic polymers are based on the total weight of the brominated styrenic polymer, unless otherwise stated.

These and other embodiments and features of this invention will be still further apparent from the ensuing description and appended claims.

FURTHER DETAILED DESCRIPTION OF THE INVENTION

Without wishing to be bound by theory, it is believed that the low molecular weight of the polybrominated anionic styrenic polymer leads to better compatibility with the fiber-forming polymer, and thus better blending, as well as more homogenous distribution of the flame retardant, giving a more uniform mixture, which results in fibers and filaments that are more uniform. Also without wishing to be bound by theory, it is thought that the melt-blendable nature of low molecular weight brominated anionic styrenic polymer minimizes interference on color matching. This is advantageous in that less pigment needs to be added to the fibers to achieve the desired color.

A. Fibers and Filaments of the Invention

In the fibers and filaments of the invention in which the thermoplastic polymer is a polyester, the polybrominated anionic styrenic polymer is generally present in a flame resistant or flame retardant amount, where the term "flame resistant" refers to improved (reduced) afterflame times and similar properties, which are better than the same property measured in a fiber or filament not containing a flame retardant. Typical flame resistant or flame retardant amounts of a flame retardant such as a polybrominated anionic styrenic polymer are about 1 wt % to about 20 wt %, although the amount can be lower or higher as needed for a particular application. Preferred amounts of polybrominated anionic styrenic polymer in the polyester fiber or filament vary with the molecular weight of the polyester, the presence or absence of a synergist, and the application for which the fiber or filament is intended. Generally, for fibers and filaments in which the fiber-forming thermoplastic polymer is a polyester, the amount of polybrominated anionic styrenic polymer is no more than about 15 wt %. More preferably, the amount of polybrominated anionic styrenic polymer in a polyester fiber or filament is no more than about 10 wt %; still more preferred is no more than about 5 wt % polybrominated anionic styrenic polymer. Typically, for polyester fibers and filaments which will be formed into yarns, the amount of polybrominated anionic styrenic polymer in the polyester fiber or filament is preferably is less than the amount for an equivalent fiber or filament that will not be formed into yarns.

The polybrominated anionic styrenic polymer is at least about 2 wt % of the fiber or filament when the fiber-forming thermoplastic polymer is a polyamide. For polyamide fibers and filaments, amounts of polybrominated anionic styrenic polymer of at least about 2 wt % provide greater flame resistance, such as reduced afterflame times. Preferred polyamide fibers and filaments have at least about 5 wt % polybrominated anionic styrenic polymer; more preferred polyamide fibers and filaments have at least about 10 wt % polybrominated anionic styrenic polymer. Typically, flame resistance and flame retardant amounts of a flame retardant such as a polybrominated anionic styrenic polymer are 20 wt % or less for practical and/or cost reasons, although the amount can be higher as needed for a particular application.

When the fiber-forming thermoplastic polymer is a polyolefin, the polybrominated anionic styrenic polymer is no more than about 15 wt % of the fiber or filament. Preferably, the amount of polybrominated anionic styrenic polymer in a polyolefin fiber or filament is no more than about 10 wt %. More preferred fibers and filaments are those in which the amount of polybrominated anionic styrenic polymer in a polyolefin fiber or filament is no more than about 5 wt %. Polyolefin fibers and filaments having no more than about 15 wt % polybrominated anionic styrenic polymer provide greater flame resistance, such as significantly reduced afterflame times in comparison to polyolefin without any flame retardant.

Other ingredients may also be present in the fiber or filament. In particular, flame retardant synergists are often used. The amount of flame retardant synergist, when used, generally will be in the range of up to about 12 wt % based on the total weight of the finished fiber or filament. As stated before, when the fiber-forming thermoplastic polymer is a polyolefin, a synergist is present. For fibers and filaments in which the thermoplastic polymer is a polyolefin, the synergist is preferably in the range of about 0.5 wt % to about 5 wt % of the fiber or filament, and the synergist preferably has an average particle of less than about 0.5 microns; a preferred synergist is antimony oxide. For fibers and filaments in which the thermoplastic polymer is a polyamide or a polyester, a synergist is not necessary, but is preferred; a preferred synergist is antimony oxide. Departures from the foregoing ranges of proportions are permissible whenever deemed necessary or desirable under the particular circumstances at hand, and such departures are within the scope and contemplation of this invention. It will be appreciated that the optimum amount of polybrominated anionic styrenic polymer varies with the particular fiber-forming polymer, the application for which it is intended, any other ingredients present, and the flammability test to be passed.

Preferred fibers and filaments of the invention in which the thermoplastic polymer is a polyester have no more than about 15 wt % polybrominated anionic styrenic polymer more preferably, the amount of polybrominated anionic styrenic polymer in the polyester fiber or filament is preferably no more than about 10 wt %. More preferably, fibers and filaments in which the thermoplastic polymer is a polyester also have no more than about 5 wt % of a synergist. Fibers and filaments of the invention in which the thermoplastic polymer is a polyamide preferably have at least about 5 wt % polybrominated anionic styrenic polymer, and more preferably, also have at least about 1.5 wt % of a synergist. Preferred fibers and filaments of the invention in which the thermoplastic polymer is a polyolefin preferably have no more than about 10 wt % polybrominated anionic styrenic polymer. More preferably, a fiber or filament in which the thermoplastic polymer is a polyolefin has no more than about 5 wt % polybrominated anionic styrenic polymer and at least about 0.5 wt % of a synergist.

Pursuant to this invention, nylon fiber containing brominated anionic polystyrene was formed, and illustrates the beneficial qualities imparted to a fiber or filament of the invention. This inventive nylon fiber had decreased water uptake in comparison to neat nylon fiber (well-known in the art for its high water uptake). A result of the decreased water uptake was an increase in fiber stiffness and improved dimensional stability. Further, the domain size of brominated anionic polystyrene in some nylons is very small, as measured by scanning electron microscopy (SEM).

1. Fiber-forming Thermoplastic Polymer

The fiber-forming polymers in the compositions of the invention are thermoplastic, and include polyesters, polyamides (nylons), polyolefins, acrylates, and mixtures of such thermoplastics. Polyesters and polyamides are preferred types of fiber-forming thermoplastic polymers.

Thermoplastic polyesters, often referred to as polyalkylene terephthalates, are reaction products of a dicarboxylic acid together with a diol and/or a hydroxy carboxylic acid; the self-condensation of a hydroxy carboxylic acid; or mixtures of such reaction products. Reactive derivatives of dicarboxylic acids, such as methyl esters or anhydrides, may also be used. Related copolyesters and blends, including blends of one or more thermoplastic polyesters with one or more other thermoplastic polymers such as polycarbonates, are included as fiber-forming thermoplastic polymers that can be used in the compositions of the invention.

Dicarboxylic acids which can be used in the formation of polyesters include aliphatic dicarboxylic acid having 2-20 carbon atoms such as azelaic acid, adipic acid, sebacic acid, and dodecanedicarboxylic acid; alicyclic dicarboxylic acids such as cyclopentanedicarboxylic acid and cyclohexanedicarboxylic acid; and aromatic dicarboxylic acids such as terephthalic acid, isophthalic acid, orthophthalic acid, hydroxybenzoic acid, hydroxynaphthoic acid, diphenylenehydroxycarboxylic acid, naphthalene-dicarboxylic acid, and the like. Alkyl and/or alkoxy substituted derivatives of these acids may also be used. These dicarboxylic acids may be each used in the form of their ester-forming derivatives, such as dimethyl esters. Mixtures of two or more of the foregoing dicarboxylic acids (and/or their ester-forming derivatives) can be used.

Diols that can be used to form polyesters include, but are not limited to, ethylene glycol, 1,2-propanediol, 1,3-propanediol, 1,4-butanediol, 2,3-butanediol, 1,5-pentanediol, neopentyl glycol, 1,6-hexanediol, 1,10-decanediol, 1,3-cyclohexanediol, 1,4-cyclohexanediol, 1,4-bishydroxymethylcyclohexane, hydroquinone, resorcinol, catechol, napthalenediol, dihydroxydiphenyl ether, 2,2-bis(4-hydroxyphenyl)propane and diethoxylated bisphenol A. Alkyl and/or alkoxy substituted derivatives of these diols also may be used. Mixtures of two or more of the foregoing diols also may be suitable for use.

The polyester to be used in the present invention also may be a polyester having a branched or crosslinked structure which is prepared by using a minor amount of a trifunctional monomer in addition to the above components. Preferred trifunctional monomers include trimellitic, trimesic and pyromellitic acids, pentaerythritol and trimethylolpropane. Mixtures of two or more polyesters may be used. Preferred polyesters in this invention are polyethylene terephthalate, polybutylene terephthalate, or polytrimethylene terephthalate. More preferred are polyethylene terephthalate and polybutylene terephthalate.

Polyalkylene terephthalates may be produced by known methods. See, for example, *Encyclopedia of Polymer Science and Technology*, Vol. 11, pages 62-128, John Wiley & Sons, Inc., copyright 1969; and Kirk-Othmer, *Encyclopedia of Chemical Technology*, 4th Ed., Vol. 19, pages 609-653, John Wiley & Sons, Inc., copyright 1996.

The polyamide thermoplastic fiber-forming polymer can be any amorphous and/or partly crystalline, predominately aliphatic/cycloaliphatic or partially aromatic thermoplastic polyamide. Typically such materials are produced by polycondensation and/or polymerization processes from diamines which are predominately or entirely aliphatic or cycloaliphatic, or which are partially or entirely aromatic, and dicarboxylic acids or lactams which are predominantly or entirely aliphatic or cycloaliphatic, or which are partially or entirely aromatic. Typical amines used in forming polyamides include such diamines as hexamethylenediamine, tetramethylenediamine, 2,2,4- and 2,4,4-trimethylhexa-methylene-diamine, diaminobutane, diaminodicyclohexylmethane, diaminodicyclohexylpropane, and isophoronediamine, and xylylenediamine. Lactams with at least six carbon atoms in the ring may be used; such lactams include caprolactam, 4-tert-butylcaprolactam, 2-azacyclooctanone (enantholactam), 2-azacyclononanone, and lauryllactam (dodecanolactam). Also used as source materials are aminocarboxylic acids such as ε-aminocaproic acid, or ω-aminocarboxylic acids such as ω-aminolauric acid and ω-aminoundecanoic acid. Typically, the carboxylic acid used are aliphatic or mixed aliphatic-aromatic dicarboxylic acids having less than 50% by weight aromatic constituents such as adipic acid, 2,2,4- and 2,4,4-trimethyladipic acid, azelaic acid, sebacic acid, decanedicarboxylic acid, dodecanedicarboxylic acid, cyclohexanedicarboxylic acid, hexahydroterephthalic acid, isophthalic acid and terephthalic acid. Copolyamides from the majority of the known monomers can also be used.

Illustrative polyamides which may be used in the practice of this invention are such polyamides as nylon-6 (polycaprolactam), nylon-6,6 (from hexamethylenediamine and adipic acid), nylon-6,9, nylon-6,10 (from hexamethylenediamine and sebacic acid), nylon-6,12, nylon-11(polyundecanolactam), nylon-12 (polylauryllactam), nylon-12,12, nylon-6/66 (poly(hexamethylene adipamide-co-caprolactam)), and high temperature nylons, particularly aromatic polyamides and partially aromatic polyamides. Examples of high temperature nylons include nylon-4,6 (from diaminobutane and adipic acid), and partially aromatic nylons (e.g. Ixef polyarylamide PA MXD6 from Solvay, Zytel HTN from DuPont, and Amodel polyarylamide from BP-Amoco or Grivory HT or HT1 or HT2 from Ems-Chemie or Arlen polyarylamide from Mitsui or Genestar 9T from Kuraray). Other polyamides which may be used include Stanyl polyamide 46 from DSM, Vydyne polyamide 6/66 copolymers from Dow/Solutia, polyamide 612 (Vestamid D from Creanova), and similar polyamides.

This invention is also applicable to thermoplastic blends or alloys of one or more polyamides with one or more other thermoplastic polymers, such as, for example, polyamide-polyolefin blends or alloys. Mixtures of two or more polyamides may also be used.

Methods for producing polyamide polymers are known and described in the literature. See, for example, *Encyclopedia of Polymer Science and Technology*, Vol. 10, pages 460-482, John Wiley & Sons, Inc., copyright 1969; and Kirk- Othmer, *Encyclopedia of Chemical Technology*, 4th Ed., Vol. 19, pages 559-584, John Wiley & Sons, Inc., copyright 1996.

The thermoplastic fiber-forming polyolefins include homopolymers and copolymers of olefins such as ethylene, propylene, 1-butene, 1-pentene, 1-hexene, 1-heptene, 1-octene, and the like. Such polyolefins include, but are not limited to, polyethylene, including low-molecular-weight polyethylene, polypropylene, including low-molecular-weight polypropylene, ethylene-polypropylene copolymers, ethylene-1-butene copolymer, ethylene-1-hexene copolymers, and ethylene-1-octene copolymers.

Various polyolefins in which at least 50 percent by weight is formed from propylene are also deemed suitable for use in this invention. Copolymers of propylene that may be used include copolymers with one or more alpha-olefins such as ethylene, 1-butene, 1-pentene, 3-methyl-1-butene, and analogous alpha-olefins. Suitable polyolefin copolymers include ethylene-vinyl acetate copolymer, ethylene-methylmethacrylate copolymer, ethylene-ethyl acrylate copolymer, ethylene-acrylic acid copolymer, ethylene-vinyl alcohol copolymer, and like ethylene copolymers, and the like.

Mixtures of two or more of the foregoing olefin polymers and/or copolymers may also be used. Mixtures of polyolefins with one or more polyamides and/or one or more polyesters can also be used in the compositions of the invention.

The fiber-forming thermoplastic polymer in this invention includes acrylics, which are homopolymers and copolymers of unsaturated carboxylic acids and their alkyl esters such as acrylic acid, methacrylic acid, methylacrylate, methylmethacrylate, ethyl acrylate, butyl acrylate, ethylene glycol diacrylate, ethylene glycol dimethacrylate, diethylene glycol diacrylate, diethylene glycol dimethacrylate, triethylene glycol diacrylate, triethylene glycol dimethacrylate, 1,3-butylene glycol diacrylate, 1,3-butylene glycol dimethacrylate, 1,4-butylene glycol dimethacrylate, 1,6-hexane glycol diacrylate, 1,6-hexane glycol dimethacrylate, neopentyl glycol diacrylate, neopentyl glycol dimethacrylate, trimethylol propane triacrylate, trimethylol propane trimethacrylate, trimethylol ethane triacrylate, trimethylol ethane trimethacrylate, tetramethylol methane triacrylate, tetramethylol methane tetraacrylate, glycidyl acrylate, glycidyl methacrylate, 2-hydroxyethyl acrylate and 2-hydroxyethyl methacrylate, and the like, and vinyl esters of saturated carboxylic acids such as vinyl acetate, vinyl butyrate, and the like. Mixtures of two or more acrylic homopolymers and copolymers made from the foregoing monomers may be used.

Blends or alloys of one or more acrylics with one or more of the other types of thermoplastic fiber-forming polymers, including a polyester, a polyamide and/or a polyolefin, may also be used.

2. Polybrominated Anionic Styrenic Polymer

A polybrominated anionic styrenic polymer is an anionic styrenic polymer that has been brominated such that the bromine content of the polymer is at least about 50 wt % of the polymer, preferably at least about 60 wt %, and more preferably at least about 67 wt % of the polymer. The polybrominated anionic styrenic polymer functions as a flame retardant in the fiber and filament compositions of the invention. Moreover, the brominated styrenic polymers (preferably brominated anionic polystyrenes) used in this invention possess certain additional important properties or characteristics. These properties or characteristics pertain to such factors as thermal stability, very low ΔE color values measured using 10 wt % solutions in chlorobenzene, desirable melt flow indices, desirable GPC number average molecular weights, and total chlorine content (if any).

The above polybrominated anionic styrenic polymer used in this invention is preferably a brominated anionic polystyrene. A particularly preferred polybrominated anionic polystyrene is a polybrominated anionic polystyrene having a typical bromine content of approximately 68 wt % formed from anionic polystyrene. This product is available from Albemarle Corporation under the trade designation SAYTEX® HP-3010. Polybrominated anionic polystyrenes and their preparation are described for example in U.S. Pat. No. 6,521,714, issued Feb. 18, 2003, WO 02/072645, published Sep. 19, 2002, and U.S. application Ser. No. 10/211,648, filed Aug. 1, 2002.

3. Styrenic Polymer Reactants

Styrenic polymers which are brominated to form the polybrominated anionic styrenic polymers of this invention are homopolymers and copolymers of vinyl aromatic monomers. Preferred vinyl aromatic monomers have the formula:

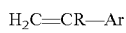

wherein R is a hydrogen atom or an alkyl group having from 1 to 4 carbon atoms and Ar is an aromatic group (including alkyl-ring substituted aromatic groups) of from 6 to 10 carbon atoms. Examples of such monomers are styrene, alpha-methylstyrene, ortho-methylstyrene, meta-methylstyrene, para-methylstyrene, para-ethylstyrene, isopropenyltoluene, vinylnaphthalene, isopropenylnaphthalene, vinylbiphenyl, vinylanthracene, the dimethylstyrenes, ethyl-alpha-methylstyrene, propylstyrene, tert-butylstyrene, the several bromostyrenes (such as the monobromo-, dibromo-, and tribromo- variants). The aromatic constituents of the monomer can be alkyl substituted, but in most cases, will not be so substituted. Styrenic polymers include, for example, polystyrene, poly-a-methylstyrene, polyvinyltoluene, styrene-a-methylstyrene copolymers and the like. Polystyrene is the preferred anionic styrenic polymer. When the polybrominated anionic styrenic polymer is made by bromination of a copolymer of two or more vinyl aromatic monomers, it is preferred that styrene be one of the monomers and that styrene comprise at least 50 weight percent of the copolymerizable vinyl aromatic monomers. If a bromo styrenic polymer is selected for bromination to make a polybrominated anionic styrenic polymer, the initial bromostyrenic polymer must have a lower bromine content than the bromine content to be present in the brominated styrenic polymer of this invention. In this connection, the terms "brominated styrenic polymer," "brominated polystyrene," and "brominated anionic polystyrene" as used in the specification and in the claims hereof refer to a brominated polymer produced by bromination of a pre-existing styrenic polymer such as polystyrene or a copolymer of styrene and at least one other vinyl aromatic monomer, as distinguished from an oligomer or polymer produced by oligomerization or polymerization of one or more brominated styrenic monomers, the properties of the latter oligomers or polymers being considerably different from brominated anionic polystyrene in a number of respects.

The styrenic polymers used in the production of the brominated styrenic polymers which are used as flame retardants in this invention are produced by anionically-initiated polymerization. See U.S. Pat. Nos. 5,902,865, 5,717,040, 4,883, 846, and 4,442,273 for descriptions of methods for anionic polymerization of vinyl aromatic monomers. As is known in the art, anionic polymerization of styrenic monomers has very high monomer conversion, and also results in monodisperse product polymer. The polystyrene used to produce the brominated anionic polystyrenes of this invention will typically have a $M_w$ within the range of from about 500 to about 500,000 and a polydispersity within the range of from at least about 1 to about 4. It is desirable to conduct the bromination of the styrenic polymer using anionic styrenic polymers such as anionic polystyrene having GPC weight average molecular weights in the range of about 500 to about 15,000, preferably in the range of about 1000 to about 10,000, and more preferably in the range of about 2000 to about 8000.

A particularly preferred process for preparing anionic styrenic polymers, described more fully in U.S. application Ser. No. 10/211,648, filed Aug. 1, 2002, and incorporated herein by reference, comprises:
A) charging a liquid saturated hydrocarbon diluent and an ether promoter into a reactor; and then
B) either
  1) (i) charging a saturated hydrocarbon solution of organolithium initiator into the reactor, in an amount to provide in the range of about 1 to about 10 mol % of organolithium initiator based on the total amount of a styrenic monomer to be added followed by (ii) the controlled addition of the styrenic monomer such that the temperature of the resultant reaction mixture is maintained at or below about 55° C.; or
  2) concurrently feeding separate feeds of (i) a styrenic monomer and (ii) a saturated hydrocarbon solution of organolithium initiator into the reactor, the feeds being maintained at rates to provide for the addition of an amount of organolithium initiator in the range of about 1 to about 10 mol % based on the total amount of styrenic monomer to be added, the temperature of the resultant reaction mixture being maintained at or below about 55° C. and feed (ii) being of a shorter duration than feed (i).

A more preferred process is a batch process in which cyclohexane and an ether promoter are charged into a reactor, and then about 1 percent of the total amount of styrene monomer is prefed to the reactor, and then separate feeds of (i) the remaining styrene monomer and (ii) a saturated hydrocarbon solution of organolithium initiator are concurrently fed into the reactor. This batch process is carried out so as to form an anionic styrenic polymer having a polydispersity index of about 1.2 or less. The styrenic monomer in this process may be any anionically polymerizable styrenic monomer, as described above. Preferably, the styrenic monomer consists essentially of styrene.

The liquid saturated hydrocarbon diluent in this particularly preferred process for preparing anionic styrenic polymers may be any aliphatic or cycloaliphatic hydrocarbon, or a mixture of two or more of the same, which is liquid under reaction conditions. The saturated hydrocarbon preferably contains in the range of about 4 to about 12 carbon atoms in the molecule, and the aliphatic hydrocarbon may be linear or branched. Non-limiting examples of suitable aliphatic hydrocarbons include pentane, isopentane, hexane, 2-methylpentane, octane, 2,2,4-trimethylpentane, and the like. More preferably, the liquid saturated hydrocarbon is one or more liquid saturated cycloaliphatic hydrocarbons. Suitable non-limiting examples of such cycloaliphatic hydrocarbons are cyclopentane, methylcyclopentane, cyclohexane, methylcyclohexane, cycloheptane, 1,3-dimethylcyclohexane, 1,4-dimethylcyclohexane, and the like, with cyclohexane being particularly preferred as the liquid saturated hydrocarbon diluent.

The ether promoter in this particularly preferred process for preparing anionic styrenic polymers may be a saturated aliphatic or cycloaliphatic monoether, a saturated aliphatic or cycloaliphatic diether or an aromatic ether. Thus, non-limiting examples of suitable ether promoters include tetrahydrofuran, methyl tert-butyl ether, ethyl tert-butyl ether, 1,4 dioxane, dimethoxyethane, methoxybenzene, and the like. The ether promoter is preferably a saturated cyclic or acyclic monoether having in the range of 4 to about 8 carbon atoms in the molecule. More preferably, the monoether is tetrahydrofuran (sometimes also referred to herein as "THF"), methyltetrahydrofuran or dimethyltetrahydrofuran, or a mixture of any two or more of these. Tetrahydrofuran is particularly preferred. In another particularly preferred embodiment of this invention, the monoether consists essentially of an alkyl tert-butyl ether. Suitable alkyl tert-butyl ethers include, e.g., linear and branched chain alkyl tert-butyl ethers such as, e.g., methyl tert-butyl ether (sometimes also referred to herein as "MTBE") and ethyl tert-butyl ether, with methyl tert-butyl ether being particularly preferred. It is desirable to use an ether that is a liquid under the reaction conditions being used.

The organolithium initiator may be one of many lithium-containing hydrocarbons. Suitable non-limiting examples include methyllithium, ethyllithium,—or sec-butyllithium, isopropyllithium, cyclohexyllithium or phenyllithium, including mixtures of the foregoing. n-Butyllithium and sec-butyllithium are preferred, with n-butyllithium being particularly preferred. The organolithium initiator is used in solution with a saturated hydrocarbon which may be the same or different from the liquid saturated hydrocarbon diluent, but is preferably the same.

Prefeeding a portion of the styrenic monomer is not required for all variations of this particularly preferred process for preparing anionic styrenic polymers, but is preferred because it appears to reduce the likelihood of reaction between the ether promoter and the organolithium initiator. The portion of the styrenic monomer which is prefed can vary, but typically will be about 1 percent by weight of the total amount of the styrenic monomer to be used in carrying out the reaction. The feeds are maintained to provide preferably in the range of about 1 to about 10 mol %, more preferably about 2 to about 5 mol %, and most preferably in the range of about 2.5 to about 3.5 mol % of organolithium initiator based on the total amount of the styrenic monomer.

When bringing the reactants together in this particularly preferred process for preparing anionic styrenic polymers, one should use the minimum feed times while at the same time maintaining the temperature of the reaction mixture no higher than about 55° C. For example, at a scale of about 4,000 lbs. of styrene feed, the feed rate of the organolithium feed is preferably about 2 to about 10 minutes, more preferably about 5 minutes, and the styrene co-feed should be effected in no more than about 2 hours, and more preferably within about 90 minutes or less, measured from initiation of co-feeding. However, when the monoether is methyl tert-butyl ether, at the foregoing scale, the styrene monomer co-feed preferably continues for a period of time not exceeding about 5 hours measured from initiation of the concurrent feeds.

The reactor used in this particularly preferred process for preparing anionic styrenic polymers is typically equipped with a overhead heat exchanger. The process may be conducted at sub-atmospheric, atmospheric or super-atmospheric pressure. However, it is preferred to carry out the reaction at a reduced pressure, e.g., in the range from about 0.1 to about 0.7 atmospheres, so that the solvent is refluxed thereby providing consequent evaporative cooling of the highly exothermic reaction. The process is preferably conducted in the absence of oxygen. Thus, the process should be carried out under an inert atmosphere such as, e.g., nitrogen or argon. The reaction system should be essentially anhydrous. By this is meant that small amounts of water insufficient to destroy the organolithium catalyst can be tolerated, but from a practical standpoint, the reaction equipment and reaction mixture should be kept as dry as reasonably practicable.

The temperature of the resultant reaction mixture in this particularly preferred process for preparing anionic styrenic polymers is maintained at or below the specified temperature of about 55° C. by any known method. For example, the reactor in which the reaction is conducted can be equipped with an external, indirect heat exchanger with a pump-around loop. The heat exchanger itself can be provided with a suitable coolant, e.g., a glycol coolant. Preferably, the reaction mixture is maintained at a temperature in the range of about 25° C. to about 50° C. After the feeds are terminated, the reaction mixture typically is held at the reaction temperature for about 5-10 minutes, e.g., when employing a scale of 3000-6000 lbs. of styrenic monomer, and then contacting the reaction mixture with an amount of water which is in the range of about 1.25 to about 10 moles of water, and preferably about 1.25 to about 5 moles of water per mole of organolithium originally charged, to quench the reaction and terminate the catalytic activity. By use of this particularly preferred process for preparing anionic styrenic polymers and termination using water, substantially all of the resultant polymer is characterized by having one of its end groups terminated by a proton (i.e., a hydrogen atom). Resulting lithium hydroxide salt hydrate is separated from the polymer solution by washing the reaction mixture with water, preferably in a 7:1 organic:aqueous weight ratio (accounting for water previously added). The aqueous phase which results is separated and the polymer-containing organic phase is devolatilized of the ether promoter and saturated hydrocarbon. Devolatization can be carried out in a variety of ways, including for example by pre-heating the mixture in a heat exchanger and feeding it into a hot (200° C.) column under conditions such that the residual solvent and promoter are less than 0.5% by weight of the isolated polymer existing at the bottom of the column. The remaining polymer may then be dissolved in a suitable solvent, e.g., bromochloromethane, for storage. Another way of terminating the reaction is to employ a lower alkyl halide, typically an alkyl chloride or an alkyl bromide, having in the range of 1 to about 8 carbon atoms. Use of an alkyl halide results in the formation of a styrenic polymer substantially all of which has one of its end groups terminated by an alkyl group rather than a proton. When using an alkyl halide to terminate the reaction, a stoichiometric amount, relative to the organolithium, should be employed. A feature of this termination method is that the reaction product can remain substantially anhydrous since no water is added during production.

The amount of saturated hydrocarbon diluent and ether promoter employed in this particularly preferred process for preparing anionic styrenic polymers may vary, but preferably is sufficient in the aggregate to cause the resultant reaction mixture to contain about 5 to about 70 wt %, and more preferably about 40 to about 60 wt %, of styrenic polymer upon termination of the styrene feed.

The number average molecular weight of the anionic styrenic polymer product made in accordance with this particularly preferred process for preparing anionic styrenic polymers can vary, but will preferably be in the range of Mn 1000 to about Mn 10,000. The anionic styrenic polymer product produced in accordance with this particularly preferred process typically will have a polydispersity which is about 1.5 or less, and preferably is about 1.2 or less.

4. Bromination of an Anionic Styrenic Polymer

Generally, a suitable process for bromination of a styrenic monomer comprises feeding a mixture of bromine and a solution of bromochloromethane and polystyrene (2.5 to 5 moles of bromine per mole of polymerized styrene in the polystyrene) to a reactor containing a further amount of bromochloromethane and a catalytic amount of $AlCl_3$. The mixture of polystyrene, bromochloromethane and bromine is substantially free of a bromination catalyst. The phrase, "substantially free of a bromination catalyst", is to be taken to mean less than a catalytically effective amount of catalyst. With such low amounts of catalyst, little or no catalyzed bromination or cross-linking should occur. Generally, such amounts will be less than 500 ppm based on the weight of polystyrene reactant present. The reaction temperature will be within the range of from about $-10°$ C. to about 15° C. Preferably, the reaction is conducted at one or more temperatures in the range of about $-10°$ C. to about 10° C. as this provides product of the highest quality and, surprisingly, the reaction itself proceeds at a suitably rapid rate at these low temperatures such that the process meets commercial production requirements. After the reaction mass is formed, it is usually maintained at reaction temperature for a period in the range of about 5 minutes to 2 hours, and preferably in the range of about 5 minutes to about 60 minutes. After this period, the reaction product is worked up by adding water and then settling to remove the acidic phase. Multiple water washes can be performed as desired. Next the reaction mass is treated with a base such as sodium hydroxide, sodium sulfite, and/or sodium borohydride, usually as an aqueous solution, to adjust the reaction pH to a suitable level of basicity and kill any remaining brominating agent. After these treatments, the reaction mass is settled to obtain a two-phase reaction mass containing an organic phase, which contains, as a solute, the brominated styrenic polymer product and an aqueous phase. The aqueous phase is decanted and the remaining organic phase is stripped of its solvent component. It is most convenient to accomplish this strip by pumping the organic phase into boiling water. As the solvent is flashed off, the brominated styrenic polymer product forms a precipitate. The precipitate can be recovered by any liquid-solid separation technique, e.g., filtration, centrifugation, etc. The recovered precipitate is then dried. If desired, especially in the case of free-radical polystyrenes, a thermal stabilizing amount of base can be incorporated in the finished brominated anionic polystyrene composition.

The catalyst used in the preferred process can be any of the aluminum based catalysts, e.g., $AlCl_3$, $AlBr_3$ and Al. Mixtures of aluminum catalysts can also be used. Once the catalyst has been added to the reaction system, it may undergo some reaction without significant loss of catalytic activity, e.g., $AlCl_3$ may convert to some extent to $AlBr_3$. $AlCl_3$, because of its availability and price, is the catalyst of choice, and powder grade $AlCl_3$ is most preferred due to its ease of dispersibility.

The catalyst is used in an amount which is sufficient to obtain the catalytic effect sought. These catalytic amounts will depend on the activity of the catalyst, but will generally fall within the range of from about 0.2 to about 10 weight percent and preferably within the range of from about 0.5 to about 5 weight percent, based on the weight of the styrenic polymer being brominated. The most active catalysts will be used in the lower amounts, while the less active catalysts will be used in the higher amounts. When $AlCl_3$ is the catalyst, amounts within the range of from about 0.5 to about 3 weight percent are preferred.

The brominating agent is preferably bromine. Bromine can be obtained commercially in the diatomic form or can be generated by the oxidation of HBr. $Br_2$ can be supplied either as a liquid or a gas. The amount of brominating agent used in the process should provide an overall mole ratio of total brominating agent to total styrenic polymer fed which will provide from about 1 to about 3 bromine substitutions per styrenic monomer unit in the polymer. It is preferred that the brominated anionic polystyrene contain at least about 60 wt % bromine, more preferably at least about 67 wt % bromine, and most preferably at least about 68 wt % bromine. For any particular styrenic polymer, the amount of brominating agent used in the process will be determined by the bromine content desired considering the highest bromine content which is obtainable with the process parameters chosen. It is pointed out that as perbromination is approached, it becomes more difficult to substitute the last bromines. Adding ever larger amounts of a brominating agent does not always attenuate this difficulty. The stoichiometry is easily determined, as it requires one mole of $Br_2$ per substitution sought. In practice, the practitioner will determine the bromine content sought on a weight basis and then will calculate, on an idealized basis, the number of moles of brominating agent needed to obtain the same. For example, if the styrenic polymer is polystyrene and the bromine content sought is 68 wt %, at least 2.7 moles of bromine per styrenic monomer unit will be required, not including any desired stoichiometric excess.

While the foregoing describes the overall quantitative relationship between the brominating agent and styrenic polymer, the quantitative relationship between these two reactants in the feed mixture has not been fully discussed. Generally, the mixture which is to be fed is formed from about 1 to about 8 moles of brominating agent per mole of styrenic monomer units at any time during the feed period. During the feed, the quantitative relationship can be constant or can vary within the above-mentioned range. (It is possible to allow for some excursions outside of the range so long as such does not do significant harm to the process efficiency or to product quality.) A preferred range is from about 2.5 to about 5 moles of brominating agent per mole of styrenic monomer units to form the feed mixture. As can be appreciated, the use of an amount of brominating agent in the feed mixture which gives a mole ratio of brominating agent to styrenic monomer units which is less than or greater than the selected overall mole ratio of brominating agent to styrenic monomer units will result in exhaustion of either the brominating agent or the styrenic polymer as a mixture constituent before exhaustion of the other constituent. Generally, it is preferred to have the overall molar ratio and the feed mixture ratio at least somewhat similar. In all cases though, the initial feed should preferably contain at least a molar ratio of bromine to styrenic monomer units of 1:1.

It is preferred that the bromine used in the process be essentially anhydrous, i.e., contain less than 100 ppm (weight basis) water and contain no more than 10 ppm organic impurities, e.g., oil, grease, carbonyl containing hydrocarbons, iron, and the like.

The preferred organic solvent for the bromination, namely, bromochloromethane, is preferably essentially anhydrous, containing less than 100 ppm (weight basis) water. It is most preferred that the solvent contain as little water as is practically obtainable, say between 0 to 30 ppm (weight basis).

It is possible to conduct the bromination reaction at a temperature within the range of from about −20° C. to about 60° C. Desirably, the bromination temperature is maintained within the range of from about −10° C. to about 15° C. Most preferred temperatures are in the range of from about −10° C. to about 0° C. This last-mentioned temperature range provides product of the highest quality and, surprisingly, the reaction itself proceeds at a suitably rapid rate at these low temperatures such that the process meets commercial production requirements. The pressure can be atmospheric, subatmospheric or superatmospheric.

The bromination of styrenic polymer will yield HBr as a major by-product. The HBr formed in the process first saturates the solvent and from then on HBr escapes into the head space above the reactor contents. It is preferred that the HBr be removed and passed to a water scrubber or stored as dry HBr. A dry, inert gas, e.g., nitrogen, can be used as a pad over the reactor contents to minimize the presence of water therein.

In some embodiments of this invention, the polybrominated anionic styrenic polymer is a brominated styrenic polymer having (i) a bromine content of at least about 50 wt % (preferably at least about 60 wt %, and more preferably at least about 67 wt %), and (ii) thermal stability in the Thermal Stability Test described hereinafter of 200 ppm HBr or less, preferably 150 ppm of HBr or less, and more preferably 100 ppm of HBr or less. Such polybrominated anionic styrenic polymer is especially suitable for use as a flame retardant when blended in at least a flame retardant amount with a thermoplastic polymer. Particularly preferred in this embodiment is a brominated styrenic polymer which is further characterized in that it has, prior to blending, a chlorine content, if any, of less than about 700 ppm Cl, more preferably, less than about 500 ppm Cl, and still more preferably less than about 100 ppm Cl.

In other embodiments, the polybrominated anionic styrenic polymer is a brominated styrenic polymer having (i) a bromine content of at least about 50 wt % (preferably at least about 60 wt %, and more preferably at least about 67 wt %), (ii) a TGA temperature for 1% weight loss which is 340° C. or higher, preferably within the range of from about 340° C. to about 380° C., and more preferably within the range of from about 345° C. to about 380° C., and (iii) thermal stability in the Thermal Stability Test described hereinafter of 200 ppm HBr or less, preferably 150 ppm of HBr or less, and more preferably 100 ppm of HBr or less. Such polybrominated anionic styrenic polymer is especially suitable for use as a flame retardant when blended in at least a flame retardant amount with a thermoplastic polymer. Particularly preferred in this embodiment is a brominated styrenic polymer which is further characterized in that it has a chlorine content, if any, of less than about 700 ppm Cl, more preferably, less than about 500, and still more preferably less than about 100 ppm Cl.

Pursuant to a preferred embodiment of this invention, the flame retardant is a brominated anionic styrenic polymer, preferably a brominated anionic polystyrene, that has (i) a bromine content of at least about 50 wt %, preferably at least about 60 wt %, more preferably at least about 67 wt %, and still more preferably at least about 68 wt %; (ii) a thermal stability in the Thermal Stability Test of 200 ppm of HBr or less, preferably 150 ppm of HBr or less, and more preferably 100 ppm of HBr or less; and (iii) a ΔE color value, measured using 10 wt % solutions in chlorobenzene, of less than about 10, preferably less than about 7, and more preferably less than about 5. More preferred brominated anionic styrenic polymers of this embodiment such as brominated anionic polystyrenes have GPC weight average molecular weights in the range of about 5000 to about 30,000, preferably in the range of about 7000 to about 25,000, and more preferably in the range of about 8000 to about 20,000.

In another preferred embodiment of this invention, the polybrominated anionic styrenic polymer is a brominated anionic styrenic polymer, preferably a brominated anionic polystyrene, that has (i) a bromine content of at least about 50 wt %, preferably at least about 60 wt %, more preferably at least about 67 wt %, and still more preferably at least about 68 wt %; (ii) a thermal stability in the Thermal Stability Test of 200 ppm HBr or less, preferably 150 ppm of HBr or less, and more preferably 100 ppm HBr or less; and (iii) a melt flow index of at least about 20 g/10 min, preferably at least about 25 g/10 min, and more preferably at least about 30 g/10 min in the Melt Flow Index Test as described hereinafter. More preferred brominated anionic styrenic polymers of this embodiment such as brominated anionic polystyrenes have a GPC weight average molecular weight in the range of about 5000 to about 30,000, preferably in the range of about 7000 to about 25,000, and more preferably in the range of about 8000 to about 20,000.

In still another preferred embodiment of this invention, the polybrominated anionic styrenic polymer is a brominated anionic styrenic polymer, preferably a brominated anionic polystyrene, that has (i) a bromine content of at least about 50 wt %, preferably at least about 60 wt %, more preferably at least about 67 wt %, and still more preferably at least about 68 wt %; and (ii) a melt flow index of at least about 20 g/10 min, preferably at least about 25 g/10 min, and more preferably at least about 30 g/10 min in the Melt Flow Index Test as described hereinafter. In more preferred embodiments, these brominated styrenic polymers such as brominated anionic polystyrene also have (I) a ΔE color value, measured using 10 wt % solutions in chlorobenzene, of less than about 10, preferably less than about 7, and more preferably less than about 5; or (II) a TGA temperature for a 1% weight loss under nitrogen of at least about 340° C., and preferably at least about 350° C.; or (III) a GPC weight average molecular weight in the range of about 5000 to about 30,000, preferably in the range of about 7000 to about 25,000, and more preferably in the range of about 8000 to about 20,000. Still more preferred compositions of this embodiment possess at least any two of (I), (II), and (III), e.g., (I) and (II); (I) and (III); or (II) and (III). Even more preferred are compositions of this embodiment that possess all three of (I), (II), and (III).

A further preferred embodiment of this invention has as the flame retardant a brominated anionic styrenic polymer, preferably a brominated anionic polystyrene, that has (i) a bromine content of at least about 50 wt %, preferably at least about 60 wt %, more preferably at least about 67 wt %, and still more preferably at least about 68 wt %; (ii) a ΔE color value, measured using 10 wt % solutions in chlorobenzene, of less than about 10, preferably less than about 7, and more preferably less than about 5; and (iii) a GPC weight average molecular weight in the range of about 5000 to about 30,000, preferably in the range of about 7000 to about 25,000, and more preferably in the range of about 8000 to about 20,000. In more preferred embodiments, these brominated styrenic polymers such as brominated anionic polystyrene also have a TGA temperature for a 1% weight loss under nitrogen of at least about 340° C., and preferably at least about 350° C.

The polybrominated anionic styrenic polymer in still another preferred embodiment of this invention is a brominated anionic styrenic polymer, preferably a brominated anionic polystyrene, that has (i) a bromine content of at least about 50 wt %, preferably at least about 60 wt %, more preferably at least about 67 wt %, and still more preferably at least about 68 wt %; (ii) a thermal stability in the Thermal Stability Test of 200 ppm HBr or less, preferably 150 ppm of HBr or less, and more preferably 100 ppm HBr or less; (iii) a melt flow index of at least about 20 g/10 min, preferably at least about 25 g/10 min, and more preferably at least about 30 g/10 min in the Melt Flow Index Test as described hereinafter; and (iv) a ΔE color value, measured using 10 wt % solutions in chlorobenzene, of less than about 10, preferably less than about 7, and more preferably less than about 5. In more preferred embodiments, the brominated styrenic polymers such as brominated anionic polystyrene described in this paragraph are further characterized in that they have a GPC weight average molecular weight in the range of about 5000 to about 30,000, preferably in the range of about 7000 to about 25,000, and more preferably in the range of about 8000 to about 20,000; and/or a TGA temperature for a 1% weight loss under nitrogen of at least about 340° C., and preferably at least about 350° C.

A further preferred embodiment of this invention has as the polybrominated anionic styrenic polymer a brominated anionic styrenic polymer, preferably a brominated anionic polystyrene, that has (i) a bromine content of at least about 50 wt %, preferably at least about 60 wt %, more preferably at least about 67 wt %, and still more preferably at least about 68 wt %; (ii) a thermal stability in the Thermal Stability Test of 200 ppm HBr or less, preferably 150 ppm HBr or less, and more preferably 100 ppm HBr or less; and (I) that is essentially free of impurities selected from the group consisting of (a) methylene chloride, (b) ethylene dichloride, and especially (c) bromodichloroethane, (d) dibromochloroethane, (e) dibromodichloroethane, (f) tribromochloroethane, and (g) any mixture of two or more of the foregoing, especially a mixture that contains at least one of (c) through (f); (II) that has an ionic bromine content of 2000 ppm or less, preferably 1500 ppm or less, more preferably 1000 ppm or less, and still more preferably 500 ppm or less; or (III) that contains, if any, less than about 700 ppm Cl, preferably less than 500 ppm Cl, and more preferably less than 100 ppm Cl. More preferred compositions of this embodiment possess at least any two of (I), (II), and (III), e.g., (I) and (II); (I) and (III); or (II) and (III). Still more preferred are polybrominated anionic styrenic polymers that possess all three of (I), (II), and (III).

Particularly preferred polybrominated anionic styrenic polymers are those anionic styrenic polymers that are prepared according to the particularly preferred process for preparing anionic styrenic polymers, as described above, and then brominated, most preferably as described in this paragraph. Each of the patents described in this paragraph is incorporated herein by reference. Such anionic styrenic polymer may be brominated by placing it in admixture with a brominating agent, such admixture being substantially free of a bromination catalyst, and fed to a catalytic quantity of a brominating agent. For further detailed teaching of such styrenic polymer bromination process, reference is made, for example, to U.S. Pat. No. 5,677,390. Another bromination method is to place the anionic styrenic polymer in solution and in admixture with a brominating agent, such admixture being substantially free of a bromination catalyst, and fed to a reactor containing a bromination catalyst and associated liquid, wherein the solvent used in forming the polystyrene solution and the liquid associated with the catalyst contains less than 200 ppm water between the two of them and the brominating agent contains less than about 100 ppm water. For detailed teaching of such polystyrene bromination process, reference is made, for example, to U.S. Pat. No. 5,852, 132. Still another method for bromination is to contact the anionic styrenic polymer with a brominating agent in the presence of Lewis acid catalyst and solvent quantities of bromochloromethane. For further detailed teaching of such styrenic polymer bromination process, reference is made, for example, to U.S. Pat. No. 5,767,203. Yet another way to brominate the anionic polymer calls for bromochloromethane solvent and a Lewis acid catalyst to be placed in a reaction vessel, and then a brominating agent is added to the vessel. Alternatively, the polystyrene is not placed in the reaction vessel initially; it is instead feed in admixture with the brominating agent to the reaction vessel which was previously charged with bromochloromethane solvent and a Lewis acid catalyst. For further detailed teaching of such polystyrene bromination process, reference is made, for example, to U.S. Pat. No. 5,916,978. Still another process for bromination involves a first stream comprising brominating agent, a second stream comprising anionic styrenic polymer formed as taught herein, and a third stream comprising bromination catalyst, which are fed to a mixer to intimately mix such streams. For further detailed teaching of such styrenic polymer bromination process, reference is made, for example, to U.S. Pat. No. 5,686,538. In another bromination method, a bromination catalyst and associated liquid are provided in a reactor and a portion of the bromination catalyst and associated liquid is fed to a mixer external of the reactor; a brominating agent and a solution of anionic polystyrene formed in accordance with the process taught herein are fed as separate streams to the external mixer, in which the separate streams, prior to being fed to the external mixer, are substantially free of a bromination catalyst, the solvent used in forming the polystyrene solution and the liquid associated with the catalyst contains less than 200 ppm water between the two of them, and the brominating agent contains less than about 100 ppm water. For further detailed teaching of such polystyrene bromination process, reference is made, for example, to U.S. Pat. No. 5,852,131. Bromination may also be accomplished by mixing the anionic styrenic polymer with a brominating agent and fed to a reaction vessel to which was previously added bromochloromethane solvent and a Lewis acid catalyst, the mole ratio of brominating agent to polystyrene in the feed mixture being from about 1:1 to about 8:1. For further detailed teaching of such polystyrene bromination process, reference is made, for example, to U.S. Pat. No. 6,207,765 B1.

B. Analytical Methods for Polybrominated Anionic Styrenic Polymer

Bromine Content. Since brominated styrenic polymers have good, or at least satisfactory, solubility in solvents such as tetrahydrofuran (THF), the determination of the bromine content for the brominated styrenic polymers is easily accomplished by using conventional X-ray fluorescence (XRF) techniques. The sample analyzed is a dilute sample, say 0.1±0.05 g brominated anionic polystyrene in 60 mL THF. The XRF spectrometer can be a Phillips PW1480 Spectrometer. A standardized solution of bromobenzene in THF is used as the calibration standard. The bromine values described herein are all based on the XRF analytical method.

ΔE Color Value. To determine the color attributes of the brominated styrenic polymers used in this invention, use is again made of the ability to dissolve brominated styrenic polymers in easy-to-obtain solvents, such as chlorobenzene. Weigh 5 g±0.1 g of the brominated anionic polystyrene into a 50 mL centrifuge tube. To the tube also add 45 g±0.1 g chlorobenzene. Close the tube and shake for 1 hour on a wrist action shaker. After the 1 hour shaking period, examine the solution for undissolved solids. If a haze is present, centrifuge the solution for 10 minutes at 4000 rpm. If the solution is still not clear, centrifuge an additional 10 minutes. Should the solution remain hazy, then it should be discarded as being incapable of accurate measurement. If, however, a clear solution is obtained, it is submitted for testing in a HunterLab ColorQuest Sphere Spectrocolorimeter. A transmission cell having a 20-mm transmission length is used. The calorimeter is set to "Delta E-lab" to report color as ΔE and to give color values for "L", "a" and "b". Product color is determined as total color difference (ΔE) using Hunter L, a, and b scales for the 10% by weight concentrations of the product in chlorobenzene versus chlorobenzene according to the formula:

$$\Delta E=[(\Delta L)^2+(\Delta a)^2+(\Delta b)^2]^{1/2}$$

Thermal Stability Test. To determine thermal stability and estimate the corrosive potential of a sample, the Thermal Stability Test is used. The test procedure, described in U.S. Pat. No. 5,637,650, is used in the following manner. Each sample is run in duplicate. A 2.00±0.01 g sample is placed into a new clean 20×150 mm test tube. With a neoprene stopper and Viton® fluoroelastomer tubing, the test tube is connected to a nitrogen purge line with exit gas from the test tube being passed successively through subsurface gas dispersion frits in three 250-mL sidearm filter flasks each containing 200 mL of 0.1 N NaOH and 5 drops of phenolphthalein. With a constant nitrogen purge at 0.5 SCFH, the test tube is heated at 300° C. in a molten salt bath (51.3% $KNO_3$/48.7% $NaNO_3$) for 15 minutes followed by 5 minutes at ambient temperature. The test tube containing the sample is then replaced with a clean dry test tube, and the apparatus is purged with nitrogen for an additional 10 minutes with the empty test tube in the 300° C. salt bath. The test tube, tubing and gas dispersion tubes are all rinsed with deionized water, and the rinse is combined quantitatively with the solutions in the three collection flasks. The combined solution is acidified with 1:1 $HNO_3$ and titrated with 0.01 N $AgNO_3$ using an automatic potentiometric titrator (Metrohm 670, 716, 736, or equivalent). Results are calculated as ppm HBr, ppm HCl, and ppm HBr equivalents as follows:

ppm HBr=(EP 1)(N)(80912)/(sample wt.)

ppm HCl=(EP 2–EP 1)(N)(36461)/(sample wt.

ppm HBr equivalents=(EP 2)(N)(80912)/(sample wt.)

where EP(x)=mL of $AgNO_3$ used to reach end point x; and N=normality of $AgNO_3$. The tubing is thoroughly dried with nitrogen before the next analysis. Each day before the first sample, three empty clean test tubes are run as blanks to assure there is no residual hydrogen halide in the system.

GPC Weight Average Molecular Weights. The $M_w$ values were obtained by GPC using a Waters model 510 HPLC pump and, as detectors, a Waters Refractive Index Detector, Model 410 and a Precision Detector Light Scattering Detector, Model PD2000. The columns were Waters, μStyragel, 500 Å, 10,000 Å and 100,000 Å. The autosampler was a Shimadzu, Model Sil 9A. A polystyrene standard ($M_w$=185,000) was routinely used to verify the accuracy of the light scattering data. The solvent used was tetrahydrofuran, HPLC grade. The test procedure used entailed dissolving 0.015-0.020 g of sample in 10 mL of THF. An aliquot of this solution is filtered and 50 μL is injected on the columns. The separation was analyzed using software provided by Precision Detectors for the PD 2000 Light Scattering Detector.

The calculated theoretical $M_w$ values were obtained in accordance with the equation:

$$\text{Theoretical } M_w \text{BrPS} = \frac{M_w \text{PS}}{1 - (\text{wt \% Br})(0.01)}$$

C. Other Ingredients

Preferred fiber compositions of this invention contain at least one flame retardant synergist. Such synergists are typically used in amounts such that the weight ratio of flame retardant(s) to synergist is in the range of about 1 to about 5, and preferably in the range of about 2 to about 4. Examples of flame retardant synergists include, but are not limited to, antimony trioxide, antimony pentoxide, sodium antimonate, potassium antimonate, iron oxide, and zinc borate.

Other, conventional additives are often added to the flame retardant fiber composition to impart desired properties to the end product. One or more such additives may be made part of the flame retardant fiber composition of the invention. The additive(s) should be chosen so that the flame retardancy and other desirable properties of the composition are not adversely affected. Examples of such additives include coloring agents such as dyes and pigments, stabilizers, including heat stabilizers and light stabilizers, ultraviolet absorbers, fluorescent agents, antifogging agents, weather-proofing agents, antistatic agents, fillers, lubricants, antioxidants, dispersants, blowing agents, a release agent, processing aids, nucleating agents, reinforcing agents, plasticizers, and additional polymeric materials such as elastomers or rubbers.

It should be noted that not all of the listed optional other ingredients are compatible with all of the possible thermoplastic fiber-forming polymers or mixtures thereof. For example, antimony trioxide, a synergist, is generally not compatible with polyethylene terephthalate.

The compositions of this invention also may optionally contain a polytetrafluoroethylene resin. The polytetrafluoroethylene (PTFE) resin that may be used can be prepared by any known process technique, such as emulsion or suspension polymerization, and are readily available from a number of commercial sources. The polytetrafluoroethylene resin may be selected from among those resins having various degrees of polymerization (viscosity) depending upon the desired dispersibility characteristics of the PTFE resin, its processability as well as other physical properties which may be needed.

D. Carrier Blends of the Invention

The carrier blend is formed from ingredients comprising (i) at least one polybrominated anionic styrenic polymer, wherein the polybrominated anionic styrenic polymer has a bromine content of at least about 50 wt %, and (ii) at least one synergist or at least one other flame retardant. Component (ii) may include both another flame retardant and a synergist. As described for the compositions, the carrier blends may also optionally contain conventional additives, including, but not limited to, coloring agents, stabilizers, ultraviolet absorbers, antioxidants, and additional polymeric materials such as elastomers or rubbers. As above, such additive(s) should be chosen so that the flame retardancy and other desirable properties of the composition are not adversely affected. The advantage of such carrier blends is that high-melting components may become part of the flame-retarded fiber composition, while minimizing the negative effects that high-melting components usually have on fiber properties.

The polybrominated anionic styrenic polymer is as described above for the compositions of the invention; preferred polybrominated anionic styrenic polymers are also as described above. When the synergist and/or flame retardant has a melting or softening point above the compounding temperature of the blend (i.e., it is high-melting or non-melting), the polybrominated anionic styrenic polymer generally comprises at least about 40 weight % of the carrier blend. More preferably, the polybrominated anionic styrenic polymer comprises at least about 50 weight % of the carrier blend. The synergists are as described above for the compositions of the invention. Any synergist or flame retardant that is high-melting can be blended with the polybrominated anionic styrenic polymer to form a carrier blend. When the synergist and/or flame retardant has a melting or softening point below the compounding temperature of the blend, the polybrominated anionic styrenic polymer can comprise less than 40 weight % of the carrier blend.

Preferred carrier blends include those comprised of brominated anionic polystyrene and antimony trioxide; brominated anionic polystyrene and antimony pentoxide; brominated anionic polystyrene and sodium antimonate; and brominated anionic polystyrene and ethylenebis(tetrabromophthalimide); these blends are more preferred when the brominated anionic polystyrene has a typical bromine content of approximately 60 wt % formed from anionic polystyrene. Especially preferred carrier blends are those in which the brominated anionic polystyrene has a typical bromine content of approximately 68 wt % formed from anionic polystyrene.

Carrier blends may be formed by mixing and melting together the polybrominated anionic styrenic polymer and the synergist and/or other flame retardant, and other optional ingredients, if any. The polybrominated anionic styrenic polymer, the synergist(s) and/or other flame retardant(s), and other ingredients, if any, may be added to the device or zone in which they are to be melted, where they are simultaneously mixed and melted (preferred), or melted together and then mixed. Another method for blending the polybrominated anionic styrenic polymer and synergist and/or other flame retardant is to melt one of them, normally the polybrominated anionic styrenic polymer, and then add the other of them, usually while mixing and melting.

Alternatively, the polybrominated anionic styrenic polymer, the synergist and/or other flame retardant, and other optional ingredients may be (pre)mixed and then melted together. Premixing of the dry ingedients is not usually necessary, and is not preferred. If the polybrominated anionic styrenic polymer, the synergist and/or other flame retardant, and, if desired, other ingredients are premixed prior to the melting, such premixing can be done in a mixing machine, such as, for example, a Henschel mixer, a tumble mixer, and the like. A part or the entirety of any or all of the components may be pulverized in order to facilitate their dispersion in the mixture, although this is generally not necessary.

The compounding of the blend of the polybrominated anionic styrenic polymer and the synergist and/or other flame retardant, and other optional ingredients, if any, can be done on compounding equipment such as e.g., a twin screw extruder or a Buss kneader.

When the polybrominated anionic styrenic polymer, synergist and/or other flame retardant, and optional other ingredients are melted and mixed together without premixing, they are usually heated until the polybrominated anionic styrenic polymer softens or melts, and then all of the components are thoroughly mixed, after which the mixture is extruded. The melting and mixing can be conducted using such equipment as a single or multiple screw extruder, e.g., a twin-screw extruder, a Buss kneader, and the like.

As the compounded extrudate exits the compounding machine, the extruded strands exiting the extruder die are die-face pelletized while the mixture is cooled. Water cooling or air cooling may be employed. When water cooling, the temperature of the water is preferably at least about 60° C.; more preferably, the water temperature is in the range of about 60-70° C. More preferably, a spray of water is used. Especially preferred is air cooling (by blowing a stream of air upon the extruding carrier blend), particularly when the synergist and/or other flame retardant is high-melting. When the proportion of high-melting ingredient(s) becomes high enough, for example, when brominated anionic polystyrene is about 50% or less of the carrier blend, it has been observed that the granules formed tend to shatter when water cooled. The precise ratio at which this may occur is expected (without wishing to be bound by theory) to vary with the particular polybrominated anionic styrenic polymer used in the carrier blend.

E. Processes for Producing Flame Retardant Compositions

As stated previously, the lower viscosity and greater thermal stability of the polybrominated anionic styrenic polymer are believed to increase the ease of forming flame-retardant fibers and filaments. One method for forming such fibers or filaments is a process which comprises melt spinning (a) at least one fiber-forming thermoplastic polymer, and (b) at least one polybrominated anionic styrenic polymer. The polybrominated anionic styrenic polymer has a bromine content of at least about 50 wt %. The fiber-forming thermoplastic polymer and polybrominated anionic styrenic polymer are in proportions such that when the fiber-forming thermoplastic polymer is a polyester, the polybrominated anionic styrenic polymer is present in a flame resistant or flame retardant amount, when the fiber-forming thermoplastic polymer is a polyamide, the polybrominated anionic styrenic polymer is at least about 2 wt % of the fiber or filament, and when the fiber-forming thermoplastic polymer is a polyolefin, at least one synergist is present and the polybrominated anionic styrenic polymer is no more than about 15 wt % of the fiber or filament.

The polybrominated anionic styrenic polymer, the fiber-forming thermoplastic polymer, synergist when needed or desired, and other ingredients, if any, may be added to the device or zone in which they are to be melted and spun, where they are simultaneously mixed and melted (preferred), or melted together, then mixed, and then extruded. The flame retardant and the fiber-forming polymer may be blended by melting one component, normally the fiber-forming polymer, and then adding the other component, usually while mixing and melting. Alternatively, the polybrominated anionic styrenic polymer, the fiber-forming thermoplastic polymer, synergist, and other optional ingredients may be (pre)mixed, then melted together, and then extruded. Premixing of the dry ingedients is not usually necessary, and is not preferred.

If the polybrominated anionic styrenic polymer, the fiber-forming thermoplastic polymer, a synergist where necessary or desired, and if desired, other ingredients are premixed prior to the melting, such premixing can be done in a mixing machine, such as, for example, a Henschel mixer, a tumble mixer, and the like. A part or the entirety of any or all of the components may be pulverized in order to facilitate their dispersion in the mixture, although this is generally not necessary.

When the polybrominated anionic styrenic polymer, the fiber-forming thermoplastic polymer, synergist as needed or desired, and optional other ingredients are subjected to melt spinning without premixing, they are usually heated until the polybrominated anionic styrenic polymer and the fiber-forming thermoplastic polymer soften or melt, and then all of the components are thoroughly mixed, after which the mixture is extruded. The melting and mixing can be conducted using such equipment as a Banbury mixer, an open roller, a kneader, a single or multiple screw extruder, and the like.

Another approach to forming compositions comprising a polybrominated anionic styrenic polymer and a thermoplastic fiber-forming polymer is to form a masterbatch, normally a mixture having a high concentration of the flame retardant (the polybrominated anionic styrenic polymer). Typical proportions in a masterbatch are 90:10 polybrominated anionic styrenic polymer:thermoplastic fiber-forming polymer; other typical ratios are 80:20 and 70:30 polybrominated anionic styrenic polymer:thermoplastic fiber-forming polymer (all ratios are by weight). However, the ratio of the polybrominated anionic styrenic polymer to the thermoplastic fiber-forming polymer can be anywhere from 99:1 to 1:99. When a synergist is included in the masterbatch, as for the polyolefins or when needed for other thermoplastic fiber-forming polymers, the proportions can be, e.g., 30:60:10 polybrominated anionic styrenic polymer:thermoplastic fiber-forming polymer:synergist (all ratios are by weight); this ratio can be varied very widely, and is not limited by the presence of the synergist. The masterbatch is later re-melted with more of the thermoplastic fiber-forming polymer to form an end product with the desired ratios of flame retardant and thermoplastic fiber-forming polymer. This approach can be used in the present invention with any of the above-described mixing methods. Other desired ingredients, if any, may be added to the concentrated blend or added when the concentrated blend is mixed with more of the thermoplastic fiber-forming polymer. As the compounded extrudate exits the compounding machine, the extruded strands exiting the extruder die are die-face pelletized while the mixture is cooled. Hot or cold water cooling or air cooling may be used.

When forming fibers or filaments from carrier blends, the fiber-forming thermoplastic polymer is subjected to melt spinning with a carrier blend of this invention. Optional ingredients can be added at this point, if desired, rather than as part of the carrier blend. The methods for forming fibers and filaments from carrier blends are similar to those already described for the process for melt spinning a polybrominated anionic styrenic polymer and a thermoplastic fiber-forming polymer.

As is known in the art, fibers and filaments can be produced in a variety of linear densities. Typically, fibers and filaments with a linear density of about 2 to about 25 denier (about 0.22 to about 2.77 tex) are used for nonwoven, woven, and knitted fabrics. Fibers and filaments with such linear densities can be achieved by this invention. Moreover, it is believed that the homogeneity of the blends of polybrominated anionic styrenic polymers with thermoplastic fiber-forming polymers allows microfiber-sized fibers and filaments (about 1 denier or less) to be produced. Of course, fibers and filaments with linear densities of about 25 denier or greater can also be produced, if the application calls for such a value.

Preferred fibers and filaments of this invention have a linear density in the range of about 2 to about 25 denier; more preferred are fibers and filaments having a linear density in the range of about 2 to about 25 denier in which the polybrominated anionic styrenic polymer is a brominated anionic polystyrene. Highly preferred fibers and filaments are those in which the linear density in the range of about 2 to about 25 denier, and the polybrominated anionic styrenic polymer is a brominated anionic polystyrene having a bromine content of at least about 60 wt %; even more highly preferred is such a filament or fiber in which the bromine content is at least about 68 wt %.

It is also known in the art that melt spinning is a uniaxial extension process, and the elongational viscosity behavior, which is the stress-strain relationship in uniaxial extension, is more important than the shear viscosity behavior. In melt spinning, narrower molecular weight distributions tend to be less thinning, and elongational viscosity increases at higher extension rates. This leads to higher melt orientation, which in turn is reflected in higher spun fiber or filament orientation, higher tenacity, and lower extensibility. In contrast, broad molecular weight distributions tend to be more thinning and hence more prone to necking and fracture at high spinning speeds. Thus, the narrow molecular weight distribution of the polybrominated anionic styrenic polymer impart significant advantages to the processing of flame-retarded fibers and filaments of the invention when undergoing melt spinning.

The fibers and filaments of this invention, once formed, can be formed into threads or yarns for producing fabrics that are woven or knitted in conventional textile processes. The fibers and filaments formed by the extrusion process can also be used to form nonwoven fabrics. Alternatively, the fibers or filaments may be used as components of blends with other fibers, such as polyester/cotton blends, that are in turn formed into nonwoven, woven, or knitted fabrics. Fabrics or textiles made from the fibers and filaments of this invention can be used in carpeting (especially in high-pile carpeting), curtains, draperies, blinds, upholstery (e.g., furniture, airplane seats), tablecloths, bedding, wallcoverings, and the like.

The following examples are presented for purposes of illustration, and are not intended to impose limitations on the scope of this invention.

EXAMPLE 1

In a melt spinning apparatus, dried polyethylene terephthalate is mixed with the an amount of polybrominated anionic styrenic polymer that will be less than about 10 wt % of the fiber at 280°-300° C., and the melt is extruded into a water bath as strands. The fibers obtained are woven to form a fabric. To evaluate flame retardancy, the fabric is subjected to the small-scale NFPA-701 test (1989), a standard test established by the National Fire Protection Association. In the NFPA-701 test, a 2 inch by 10 inch piece of cloth is stretched taut over a frame, and hung vertically. This piece of fabric is put three-fourths of an inch into a 1.5 inch flame for 12 seconds. The char length, drip burn, and weight loss of the fabric are measured. To pass the NFPA-701 test, a material should have a drip burn time of zero seconds.

EXAMPLE 2

In a melt spinning apparatus, an amount of polybrominated anionic styrenic polymer that will be at least about 2 wt % of the fiber or filament is added to a molten nylon (polyamide), and the melt is extruded to give fibers or filaments. The fibers or filaments are knitted to form a fabric. Flame retardancy is evaluated by subjecting the fabric to the NFPA-701 test as described in Example 1.

EXAMPLE 3

In a melt spinning apparatus, an amount of polybrominated anionic styrenic polymer that will be no more than about 15 wt % of the fiber and a small quantity of antimony trioxide (about 5 wt % or less of the fiber and having an average particle size of about 0.3 μm) is added to a molten polypropylene, and the melt is extruded to give fibers or filaments. The fibers or filaments are woven to form a fabric. To evaluate flame retardancy, the fabric is subjected to the NFPA-701 test as described in Example 1.

EXAMPLE 4

For the following sample runs, a twin-screw extruder was used. The screws were co-rotated. Die-face pelletization was used. Cooling was with water, water spray, or a stream of air (air-cooling). The extruder had eleven separate zones, each of which was heated. For some samples, a side-feeder was used in conjunction with the twin-screw extruder. Unless otherwise stated, each sample was water cooled. Various parameters for the sample runs are summarized in Table 1. The brominated anionic polystyrene used in all runs was SAYTEX HP-3010, a product of Albemarle Corporation. The samples included two 100% brominated anionic polystyrene runs (Runs 1 and 2), which are comparative runs for the purposes of this invention. Run 2 was performed at a slightly higher temperature than Run 1. Carrier blends of brominated anionic polystyrene with antimony trioxide (White Star N, Campine N. V., Beerse, Belgium) were made in a weight ratio of 77.5% brominated anionic polystyrene to 22.5% antimony trioxide. Two runs of this blend were performed. One run, Run 3, was water-cooled, while the other run, Run 4, was air-cooled. Other conditions, listed in Table 1, were the same for both runs.

Several carrier blends of brominated anionic polystyrene with ethylenebis(tetrabromophthalimide) (SAYTEX BT-93W, Albemarle Corporation) were made. A blend having 50% brominated anionic polystyrene and 50% ethylenebis (tetrabromophthalimide) (Run 5) was made and water-cooled. The 45% brominated anionic polystyrene/55% ethylenebis(tetrabromophthalimide) sample (Run 6) was also water-cooled. Two sets of conditions were used for 40% brominated anionic polystyrene/60% ethylenebis(tetrabromophthalimide), as shown in Table 1 (Runs 7-10). Run 8 was water-cooled; Run 9 was cooled with a spray of water; Run 10 was air-cooled. For the 40%/60% brominated anionic polystyrene/ethylenebis(tetrabromophthalimide) blends, the granules were less glossy than those having higher relative proportions of brominated anionic polystyrene, which indicated that the material in the 40%/60% blends was less well compounded. In Runs 3-4 and 8-10, it was observed that although water-cooling shattered the granules, glossy granules were obtained by air-cooling instead. Presumably, granules from Runs 3, 8, and 9 will not shatter if they are air-cooled.

In the "Proportions" row of Table 1, the first number is the relative amount of brominated anionic polystyrene in the carrier blend; the second number is the relative amount of the other component present in the carrier blend.

TABLE 1

|  | Run | | | | | | |
| --- | --- | --- | --- | --- | --- | --- | --- |
|  | 1[1] | 2[1] | 3-4 | 5 | 6 | 7 | 8-10 |
| Proportions | 100% | 100% warmer | 77.5%/22.5% | 50%/50% | 45%/55% | 40%/60%, water cool only | 40%/60% |
| Screw speed | 200 rpm | 200 rpm | 200 rpm | 220 rpm | 220 rpm | 220 rpm | 220 rpm |
| Current | — | — | 12 amps | 17 amps | 19 amps | 21 amps | 17 amps |
| Throughput | 15 kg/hr | 15 kg/hr | 10 kg/hr | 15 kg/hr | 12 kg/hr | 12 kg/hr | 12 kg/hr |
| Pressure | — | 16 bar | 29 bar | 38 bar | 54 bar | 68 bar | 71 bar |

TABLE 1-continued

| | Run | | | | | | |
|---|---|---|---|---|---|---|---|
| | 1[1] | 2[1] | 3-4 | 5 | 6 | 7 | 8-10 |
| Melting temp.[2] | — | 220° C. | 223° C. | 241° C. | 247° C. | 251° C. | 258° C. |
| Granulator | — | — | — | 900 rpm | 1250 rpm | 1250 rpm | 12 rpm |
| Side-feeder | — | — | — | 145 rpm | 145 rpm | 145 rpm | 145 rpm |
| Extruder zones: | | | | | | | |
| Zone 1 | 220° C. | 220° C. | 220° C. | 220° C. | 220° C. | 220° C. | 230° C. |
| Zone 2 | 220° C. | 220° C. | 220° C. | 220° C. | 220° C. | 220° C. | 230° C. |
| Zone 3 | 210° C. | 210° C. | 210° C. | 210° C. | 210° C. | 210° C. | 220° C. |
| Zone 4 | 200° C. | 200° C. | 200° C. | 200° C. | 200° C. | 200° C. | 220° C. |
| Zone 5 | 190° C. | 190° C. | 195° C. | 195° C. | 195° C. | 195° C. | 210° C. |
| Zone 6 | 190° C. | 190° C. | 195° C. | 195° C. | 195° C. | 195° C. | 210° C. |
| Zone 7 | 185° C. | 190° C. | 195° C. | 195° C. | 195° C. | 195° C. | 210° C. |
| Zone 8 | 180° C. | 190° C. | 195° C. | 195° C. | 195° C. | 195° C. | 210° C. |
| Zone 9 | 180° C. | 190° C. | 195° C. | 195° C. | 195° C. | 195° C. | 210° C. |
| Zone 10 | 200° C. | 200° C. | 205° C. | 205° C. | 205° C. | 205° C. | 210° C. |
| Zone 11 | 200° C. | 215° C. | 215° C. | 210° C. | 210° C. | 210° C. | 210° C. |

[1]Comparative runs
[2]This is the melting temperature of the blended mixture.

EXAMPLE 5

For the following sample runs, a twin-screw extruder was used. The screws were co-rotated. Die-face pelletization was used. Cooling was with a cold water spray. The extruder had eleven separate zones, each of which was heated. For some samples, a side-feeder was used in conjunction with the twin-screw extruder. Unless otherwise stated, each sample was water cooled. Various parameters for the sample runs are summarized in Table 2. The brominated anionic polystyrene used in all runs was SAYTEX HP-3010, a product of Albemarle Corporation. In Runs 1-3, the polybutylene terephthalate was Crastin (a product of DuPont), while in Run 4 the polybutylene terephthalate was Arnite (a product of DSM).

Several masterbatches of brominated anionic polystyrene with polybutylene terephthalate were made. In the "Proportions" row of Table 2, the first number is the relative amount of brominated anionic polystyrene in the masterbatch; the second number is the relative amount of polybutylene terephthalate.

TABLE 2

| | Run | | | |
|---|---|---|---|---|
| | 1 | 2 | 3 | 4 |
| Proportions | 70%/30% | 80%/20% | 90%/10% | 70%/30% |
| Screw speed | 210 rpm | 210 rpm | 210 rpm | 210 rpm |
| Current | 16 amps | 15 amps | 16 amps | 16 amps |
| Throughput | 25 kg/hr | 25 kg/hr | 25 kg/hr | 25 kg/hr |
| Pressure | 28 bar | 24 bar | 35 bar | 28 bar |
| Melting temp.[1] | 234° | 233° C. | 230° C. | 235° C. |
| Granulator | 2550 rpm | 2560 rpm | 2630 rpm | 2610 rpm |
| Side-feeder | 133 rpm | 134 rpm | 115 rpm | 135 rpm |
| Extruder zones: | | | | |
| Zone 1 | 240° C. | 240° C. | 240° C. | 240° C. |
| Zone 2 | 230° C. | 230° C. | 230° C. | 230° C. |
| Zone 3 | 230° C. | 230° C. | 230° C. | 230° C. |
| Zone 4 | 200° C. | 200° C. | 200° C. | 200° C. |
| Zone 5 | 190° C. | 190° C. | 190° C. | 190° C. |
| Zone 6 | 190° C. | 190° C. | 180° C. | 190° C. |
| Zone 7 | 190° C. | 190° C. | 180° C. | 190° C. |
| Zone 8 | 190° C. | 190° C. | 190° C. | 190° C. |
| Zone 9 | 190° C. | 190° C. | 190° C. | 190° C. |
| Zone 10 | 210° C. | 210° C. | 210° C. | 210° C. |
| Zone 11 | 220° C. | 220° C. | 210° C. | 220° C. |

[1]This is the melting temperature of the blended mixture.

EXAMPLE 6

For the following sample runs, a twin-screw extruder was used. The screws were co-rotated. Strand granulation was used. Cooling was with water, in a cold water bath. The extruder had nine separate zones, each of which was heated. For some samples, a side-feeder was used in conjunction with the twin-screw extruder. Unless otherwise stated, each sample was water cooled. Various parameters for the sample runs are summarized in Table 3. The brominated anionic polystyrene used in all runs was SAYTEX HP-3010, a product of Albemarle Corporation.

Several masterbatches of brominated anionic polystyrene with polybutylene terephthalate were made. Some of these masterbatches also contained a synergist. In the "Proportions" row of Table 3, the first number is the relative amount of brominated anionic polystyrene in the masterbatch; the second number is the relative amount of polybutylene terephthalate; if there is a third number, it is the amount of synergist present in the masterbatch.

TABLE 3

| | Run | | | |
|---|---|---|---|---|
| | 1 | 2 | 3 | 4 |
| Proportions | 30%/70% | 30%/60%/10% | 30%/60%/10% | 30%/60%/10% |
| Synergist | none | $NaSbO_3$ | $Sb_2O_3$ | $Sb_2O_5$ |
| Screw speed | 250 rpm | 250 rpm | 250 rpm | 250 rpm |

TABLE 3-continued

| | Run | | | |
|---|---|---|---|---|
| | 1 | 2 | 3 | 4 |
| Throughput | 20 kg/hr | 20 kg/hr | 20 kg/hr | 20 kg/hr |
| Melting temp.[1] | 253° C. | 253° C. | 251° C. | 253° C. |
| Extruder zones: | | | | |
| Zone 1 | 205° C. | 205° C. | 205° C. | 205° C. |
| Zone 2 | 235° C. | 235° C. | 235° C. | 235° C. |
| Zone 3 | 240° C. | 240° C. | 240° C. | 240° C. |
| Zone 4 | 250° C. | 250° C. | 250° C. | 250° C. |
| Zone 5 | 250° C. | 250° C. | 250° C. | 250° C. |
| Zone 6 | 245° C. | 245° C. | 245° C. | 245° C. |
| Zone 7 | 245° C. | 245° C. | 245° C. | 245° C. |
| Zone 8 | 245° C. | 245° C. | 245° C. | 245° C. |
| Zone 9 | 245° C. | 245° C. | 245° C. | 245° C. |

[1]This is the melting temperature of the blended mixture.

Further embodiments of the invention include, without limitation:

aa) A fiber or filament which comprises (a) at least one fiber-forming thermoplastic polymer, and (b) at least one polybrominated anionic styrenic polymer, wherein the polybrominated anionic styrenic polymer has a bromine content of at least about 67 wt %.

ab) A fiber or filament according to aa) wherein said polybrominated anionic styrenic polymer is a brominated anionic polystyrene, wherein said fiber-forming thermoplastic polymer is a polyester, and wherein said polyester is polyethylene terephthalate, polybutylene terephthalate polyethylene terephthalate, polybutylene terephthalate, or polytrimethylene terephthalate.

ac) A fiber or filament according to aa) wherein said polybrominated anionic polymer is a brominated anionic polystyrene, wherein said fiber-styrenic forming thermoplastic polymer is a polyamide, and wherein said polyamide is nylon-6 (polycaprolactam), nylon-6,6, nylon-6,12, nylon-12 (polylauryllactam), or a high temperature nylon.

ad) A fiber or filament according to aa) wherein said polybrominated anionic styrenic polymer is a brominated anionic polystyrene, wherein said fiber-forming thermoplastic polymer is a polyolefin, and wherein said polyolefin is polypropylene.

ae) A fiber or filament according to aa) wherein said fiber-forming thermoplastic polymer is an acrylic.

af) A fiber or filament according to any of aa)-ae) wherein the linear density of said fiber or filament is in the range of about 2 to about 25 denier.

ag) A thread or yarn formed from a fiber or filament of any of aa)-af).

ah) A blend of fibers or filaments wherein a fiber or filament of any of aa)-af) is a component of said blend.

ai) A process which comprises melt spinning (a) at least one fiber-forming thermoplastic polymer, and (b) at least one polybrominated anionic styrenic polymer, wherein the polybrominated anionic styrenic polymer has a bromine content of at least about 60 wt %.

aj) A process according to ai) wherein said polybrominated anionic styrenic polymer is a brominated anionic polystyrene.

ak) A process according to ai) or aj) wherein said fiber-forming thermoplastic polymer is a polyester, and wherein said polyester is polyethylene terephthalate, polybutylene terephthalate polyethylene terephthalate, polybutylene terephthalate, or polytrimethylene terephthalate.

al) A process according to ai) or aj) wherein said fiber-forming thermoplastic polymer is a polyamide, and wherein said polyamide is nylon-6 (polycaprolactam), nylon-6,6, nylon-6,12, nylon-12 (polylauryllactam), or a high temperature nylon.

am) A process according to ai) or aj) wherein said fiber-forming thermoplastic polymer is a polyolefin, and wherein said polyolefin is polypropylene.

an) A process according to ai) or aj) wherein said fiber-forming thermoplastic polymer is an acrylic.

ao) A process as in any of ai)-an) wherein said thermoplastic fiber-forming polymer and said polybrominated anionic styrenic polymer are simultaneously mixed and melted.

ap) A process as in any of ai)-ao) the linear density of the produced fiber or filament is in the range of about 2 to about 25 denier.

aq) A process for forming a fiber or filament, which process comprises melt spinning a carrier blend together with at least one fiber-forming thermoplastic polymer, wherein said a carrier blend was formed by a process which process comprises mixing and melting together (i) at least one polybrominated anionic styrenic polymer, wherein the polybrominated anionic styrenic polymer has a bromine content of at least about 50 wt %, and (ii) at least one synergist or at least one other flame retardant.

ar) A process according to aq) wherein said fiber-forming thermoplastic polymer is a polyester, and wherein said polyester is polyethylene terephthalate, polybutylene terephthalate polyethylene terephthalate, polybutylene terephthalate, or polytrimethylene terephthalate.

as) A process according to aq) wherein said fiber-forming thermoplastic polymer is a polyamide, and wherein said polyamide is nylon-6 (polycaprolactam), nylon-6,6, nylon-6,12, nylon-12 (polylauryllactam), or a high temperature nylon.

at) A process according to aq) wherein said fiber-forming thermoplastic polymer is a polyolefin, and wherein said polyolefin is polypropylene.

au) A process according to aq) wherein said fiber-forming thermoplastic polymer is an acrylic.

av) A process according to any of aq)-au) wherein said bromine content of said polybrominated anionic styrenic polymer is at least about 60 wt %, and wherein said polybrominated anionic styrenic polymer is a brominated anionic polystyrene.

aw) A process according to any of aq)-au) wherein said bromine content of said polybrominated anionic styrenic polymer is at least about 67 wt %.

ax) A process according to aw) wherein said polybrominated anionic styrenic polymer is a brominated anionic polystyrene.

ay) A fiber or filament which comprises (a) at least one fiber-forming thermoplastic polymer, and (b) at least one polybrominated anionic styrenic polymer, wherein the polybrominated anionic styrenic polymer has a bromine content of at least about 50 wt %, wherein said polybrominated anionic styrenic polymer is at least about 2 wt % of the fiber or filament.

az) A fiber or filament according to ay) wherein said polybrominated anionic styrenic polymer is in the range of about 5 to about 20 wt % of the fiber or filament.

ba) A fiber or filament according to ay) wherein a flame retardant synergist is up to about 12 wt % of the fiber or filament.

bb) A fiber or filament according to any of ay)-ba) wherein the polybrominated anionic styrenic polymer has a bromine content of at least about 60 wt %.

bc) A fiber or filament according to any of ay)-ba) wherein said polybrominated anionic styrenic polymer has a bromine content of at least about 67 wt %.

bd) A fiber or filament according to any of ay)-bc) wherein said polybrominated anionic styrenic polymer is a brominated anionic polystyrene.

be) A composition which is a carrier blend, which blend is formed from ingredients comprising (i) at least one polybrominated anionic styrenic polymer, wherein the polybrominated anionic styrenic polymer has a bromine content of at least about 50 wt %, and (ii) at least one synergist or at least one other flame retardant, wherein (ii) is high-melting, and wherein said polybrominated anionic styrenic polymer comprises at least about 40 weight % of said carrier blend.

bf) A composition according to be) wherein said polybrominated anionic styrenic polymer comprises at least about 50 weight % of the carrier blend bg) A masterbatch which comprises (a) at least one fiber-forming thermoplastic polymer, and (b) at least one polybrominated anionic styrenic polymer, wherein the polybrominated anionic styrenic polymer has a bromine content of at least about 50 wt %, wherein said polybrominated anionic styrenic polymer is at least about 80 wt % of said masterbatch.

bh) A masterbatch according to bg) wherein said polybrominated anionic styrenic polymer is at least about 80 wt % of said masterbatch.

bi) A masterbatch according to bg) wherein said polybrominated anionic styrenic polymer is at least about 90 wt % of said masterbatch.

bj) A masterbatch according to bg) wherein said polybrominated anionic styrenic polymer is at least about 70 wt % of said masterbatch, wherein a synergist is present, and wherein said synergist is at least about 2 wt % of said masterbatch.

bk) A masterbatch according to bj) wherein said polybrominated anionic styrenic polymer is at least about 80 wt % of said masterbatch.

bl) A masterbatch according to any of bg)-bk)wherein the polybrominated anionic styrenic polymer has a bromine content of at least about 60 wt %.

bm) A masterbatch according to any of bg)-bk) wherein said polybrominated anionic styrenic polymer has a bromine content of at least about 67 wt %.

bn) A masterbatch according to any of bg)-bm) wherein said polybrominated anionic styrenic polymer is a brominated anionic polystyrene.

bo) A fiber or filament according to any of aa)-ah) wherein the weight ratio of polybrominated anionic styrenic polymer to synergist is in the range of about 1 to about 5.

bp) A fiber or filament according to any of aa)-ah) wherein the weight ratio of polybrominated anionic styrenic polymer to synergist is in the range of about 2 to about 4.

bq) A fiber or filament according to any of aa)-af) wherein said polybrominated anionic styrenic polymer has at least one of the following characteristics:
  (i) thermal stability in the Thermal Stability Test of 200 ppm HBr or less;
  (ii) a chlorine content, if any, of less than about 700 ppm Cl;
  (iii) a TGA temperature for 1% weight loss which is 340° C. or higher;
  (iv) a ΔE color value, measured using 10 wt % solutions in chlorobenzene, of less than about 10;
  (v) a melt flow index in the Melt Flow Index Test of at least about 20 g/10 min; and/or
  (vi) a GPC weight average molecular weight in the range of about 8000 to about 20,000.

br) A fiber or filament according to any of aa)-af) wherein said polybrominated anionic styrenic polymer has at least one of the following characteristics:
  (i) thermal stability in the Thermal Stability Test of 150 ppm HBr or less;
  (ii) it has a chlorine content, if any, of less than about 700 ppm Cl;
  (iii) a TGA temperature for 1% weight loss which is 340° C. or higher;
  (iv) a ΔE color value, measured using 10 wt % solutions in chlorobenzene, of less than about 7;
  (v) a melt flow index in the Melt Flow Index Test of at least about 25 g/10 min; and/or
  (vi) a GPC weight average molecular weight in the range of about 8000 to about 20,000.

bs) A fiber or filament according to any of aa)-af) wherein said polybrominated anionic styrenic polymer has at least one of the following characteristics:
  (i) thermal stability in the Thermal Stability Test of 100 ppm HBr or less;
  (ii) a chlorine content, if any, of less than about 700 ppm Cl;
  (iii) a TGA temperature for 1% weight loss which is 340° C. or higher;
  (iv) a ΔE color value, measured using 10 wt % solutions in chlorobenzene, of less than about 5;
  (v) a melt flow index in the Melt Flow Index Test of at least about 30 g/10 min; and/or
  (vi) a GPC weight average molecular weight in the range of about 8000 to about 20,000.

bt) A fiber or filament according to any of bq)-bs) wherein said polybrominated anionic styrenic polymer is a brominated anionic polystyrene.

bu) A fiber or filament according to aa) wherein said polybrominated anionic styrenic polymer is produced by bromination of an anionic styrenic polymer, which anionic styrenic polymer is produced by a batch process, which process comprises charging a liquid saturated hydrocarbon diluent and an ether promoter into a reactor; and then (i) charging a saturated hydrocarbon solution of organolithium initiator into the reactor, in an amount to provide in the range of about 1 to about 10 mol% of organolithium initiator based on the total amount of a styrenic monomer to be added followed by (ii) the controlled addition of the styrenic monomer such that the temperature of the resultant reaction mixture is maintained at or below about 55° C.

bv) A fiber or filament according to aa) wherein said polybrominated anionic styrenic polymer is produced by bromination of an anionic styrenic polymer, which anionic styrenic polymer is produced by a batch process, which process comprises charging a liquid saturated hydrocarbon diluent and an ether promoter into a reactor; and then concurrently feeding separate feeds of (i) a styrenic monomer and (ii) a saturated hydrocarbon solution of organolithium initiator into the reactor, the feeds being maintained at rates to provide for the addition of an amount of organolithium initiator in the range of about 1 to about 10 mol% based on the total amount of styrenic monomer to be added, the temperature of the resultant reaction mixture being maintained at or below about 55° C. and feed (ii) being of a shorter duration than feed (i).

bw) A fiber or filament according to any of bu)-bv) wherein said polybrominated anionic styrenic polymer is a brominated anionic polystyrene.

bx) A fiber or filament according to any of bu)-bv) wherein said polybrominated anionic styrenic polymer has a thermal stability in the Thermal Stability Test of 200 ppm HBr or less and a TGA temperature for 1% weight loss which is 340° C. or higher.

by) A fiber or filament according to any of bu)-bv) wherein said polybrominated anionic styrenic polymer has a thermal stability in the Thermal Stability Test of 200 ppm HBr or less, a ΔE color value, measured using 10 wt % solutions in chlorobenzene, of less than about 10, and a melt flow index in the Melt Flow Index Test of at least about 20 g/10 min.

bz) A fiber or filament which comprises (a) at least one fiber-forming thermoplastic polymer, and (b) at least one polybrominated anionic styrenic polymer, wherein the polybrominated anionic styrenic polymer has a bromine content of at least about 50 wt %, wherein said polybrominated anionic styrenic polymer has a thermal stability in the Thermal Stability Test of 200 ppm HBr or less and a TGA temperature for 1% weight loss which is 340° C. or higher.

ca) A fiber or filament which comprises (a) at least one fiber-forming thermoplastic polymer, and (b) at least one polybrominated anionic styrenic polymer, wherein the polybrominated anionic styrenic polymer has a bromine content of at least about 50 wt %, wherein said polybrominated anionic styrenic polymer has a thermal stability in the Thermal Stability Test of 200 ppm HBr or less, a ΔE color value, measured using 10 wt % solutions in chlorobenzene, of less than about 10, and a melt flow index in the Melt Flow Index Test of at least about 20 g/10 min.

cb) A fiber or filament according to ca) wherein said bromine content of said polybrominated anionic styrenic polymer is at least about 60 wt %, and wherein said polybrominated anionic styrenic polymer is a brominated anionic polystyrene.

cc) A thread or yarn formed from a fiber or filament of any of bq)-cb).

cd) A blend of fibers or filaments wherein a fiber or filament of any of bq)-cb) is a component of said blend.

ce) A process for producing a fiber or filament, which process comprises melt spinning (a) at least one fiber-forming thermoplastic polymer, and (b) at least one polybrominated anionic styrenic polymer, wherein the polybrominated anionic styrenic polymer has a bromine content of at least about 50 wt %, wherein said polybrominated anionic styrenic polymer has a thermal stability in the Thermal Stability Test of 200 ppm HBr or less and a TGA temperature for 1% weight loss which is 340° C. or higher.

cf) A process for producing a fiber or filament, which process comprises melt spinning (a) at least one fiber-forming thermoplastic polymer, and (b) at least one polybrominated anionic styrenic polymer, wherein the polybrominated anionic styrenic polymer has a bromine content of at least about 50 wt %, wherein said polybrominated anionic styrenic polymer has a thermal stability in the Thermal Stability Test of 200 ppm HBr or less, a ΔE color value, measured using 10 wt % solutions in chlorobenzene, of less than about 10, and a melt flow index in the Melt Flow Index Test of at least about 20 g/10 min.

cg) A process according to any of ce)-cf) wherein said bromine content of said polybrominated anionic styrenic polymer is at least about 60 wt %, and wherein said polybrominated anionic styrenic polymer is a brominated anionic polystyrene.

It is to be understood that the reactants and components referred to by chemical name or formula anywhere in this document, whether referred to in the singular or plural, are identified as they exist prior to coming into contact with another substance referred to by chemical name or chemical type (e.g., another reactant, a solvent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical operation or reaction or in forming a mixture to be used in conducting a desired operation or reaction. Also, even though an embodiment may refer to substances, components and/or ingredients in the present tense ("is comprised of", "comprises", "is", etc.), the reference is to the substance, component or ingredient as it existed at the time just before it was first contacted, blended or mixed with one or more other substances, components and/or ingredients in accordance with the present disclosure.

Also, even though the claims may refer to substances in the present tense (e.g., "comprises", "is", etc.), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation within the spirit and scope of the appended claims.

The invention claimed is:

1. A fiber or filament formed from ingredients comprising (a) at least one fiber-forming thermoplastic polymer, and (b) at least one polybrominated anionic styrenic polymer, wherein the polybrominated anionic styrenic polymer has a bromine content of at least about 50 wt %; when the fiber-forming thermoplastic polymer is a polyester, the polybrominated anionic styrenic polymer is less than about 5 wt % of the fiber or filament, and when the fiber-forming thermoplastic polymer is a polyolefin, at least one synergist is present and the polybrominated anionic styrenic polymer is about 5 wt % or less of the fiber or filament.

2. A fiber or filament as in claim 1 wherein said fiber-forming thermoplastic polymer is a polyester, and wherein said polyester is polyethylene terephthalate, polybutylene terephthalate, or polytrimethylene terephthalate.

3. A fiber or filament as in claim 1 wherein said fiber-forming thermoplastic polymer is a polyolefin.

4. A fiber or filament as in claim 3 wherein said polyolefin is polypropylene.

5. A fiber or filament as in claim 4 wherein the synergist is at least about 0.5 wt % of the fiber or filament.

6. A fiber or filament as in claim 1 wherein said bromine content of said polybrominated anionic styrenic polymer is at least about 60 wt %, and wherein said polybrominated anionic styrenic polymer is a brominated anionic polystyrene.

7. A fiber or filament as in claim 1 wherein said fiber-forming thermoplastic polymer is a polyester, wherein said polyester is polyethylene terephthalate, polybutylene terephthalate, or polytrimethylene terephthalate, wherein said polybrominated anionic styrenic polymer is a brominated anionic polystyrene, and wherein said bromine content of said polybrominated anionic styrenic polymer is at least about 67 wt %.

8. A fiber or filament as in claim 1 wherein said fiber-forming thermoplastic polymer is a polyolefin, wherein said polyolefin is polypropylene, wherein said bromine content of said polybrominated anionic styrenic polymer is at least about 60 wt %, and wherein said polybrominated anionic styrenic polymer is a brominated anionic polystyrene.

9. A fiber or filament as in claim 1 wherein said fiber-forming thermoplastic polymer is a polyolefin, wherein said polyolefin is polypropylene, wherein said bromine content of said polybrominated anionic styrenic polymer is at least about 67 wt %, and wherein said polybrominated anionic styrenic polymer is a brominated anionic polystyrene.

10. A fiber or filament as in claim 1 wherein said polybrominated anionic styrenic polymer is a brominated anionic polystyrene, and wherein the linear density of said fiber or filament is in the range of about 2 to about 25 denier.

11. A thread or yarn formed from a fiber or filament of claim 1.

12. A blend of fibers or filaments wherein a fiber or filament of claim 1 is a component of said blend.

13. A fiber or filament as in claim 1 wherein said polybrominated anionic styrenic polymer has at least one of the following characteristics:
(i) a thermal stability in the Thermal Stability Test of 200 ppm HBr or less;
(ii) a chlorine content, if any, of less than about 700 ppm Cl;
(iii) a TGA temperature for 1% weight loss which is 340° C. or higher;
(iv) a ΔE color value, measured using 10 wt % solutions in chlorobenzene, of less than about 10;
(v) a melt flow index in the Melt Flow Index Test of at least about 20 g/10 min; and/or
(vi) a GPC weight average molecular weight in the range of about 8000 to about 20,000.

14. A fiber or filament as in claim 13 wherein said bromine content of said polybrominated anionic styrenic polymer is at least about 60 wt %, and wherein said polybrominated anionic styrenic polymer is a brominated anionic polystyrene.

15. A fiber or filament as in claim 14 wherein said fiber-forming thermoplastic polymer is a polyester, and wherein said polyester is polyethylene terephthalate, polybutylene terephthalate, or polytrimethylene terephthalate.

16. A fiber or filament as in claim 14 wherein said fiber-forming thermoplastic polymer is a polyolefin, and wherein said polyolefin is polypropylene.

17. A fiber or filament as in claim 1 wherein said polybrominated anionic styrenic polymer is produced by bromination of an anionic styrenic polymer, which anionic styrenic polymer is produced by a batch process, which process comprises charging a liquid saturated hydrocarbon diluent and an ether promoter into a reactor; and then
A) (i) charging a saturated hydrocarbon solution of organolithium initiator into the reactor, in an amount to provide in the range of about 1 to about 10 mol % of organolithium initiator based on the total amount of a styrenic monomer to be added followed by (ii) the controlled addition of the styrenic monomer such that the temperature of the resultant reaction mixture is maintained at or below about 55° C.,
or
B) concurrently feeding separate feeds of (i) a styrenic monomer and (ii) a saturated hydrocarbon solution of organolithium initiator into the reactor, the feeds being maintained at rates to provide for the addition of an amount of organolithium initiator in the range of about 1 to about 10 mol % based on the total amount of styrenic monomer to be added, the temperature of the resultant reaction mixture being maintained at or below about 55° C. and feed (ii) being of a shorter duration than feed (i).

18. A fiber or filament as in claim 17 wherein said bromine content of said polybrominated anionic styrenic polymer is at least about 60 wt %, and wherein said polybrominated anionic styrenic polymer is a brominated anionic polystyrene.

19. A fiber or filament as in claim 18 wherein said fiber-forming thermoplastic polymer is a polyester, and wherein said polyester is polyethylene terephthalate, polybutylene terephthalate, or polytrimethylene terephthalate.

20. A fiber or filament as in claim 18 wherein said fiber-forming thermoplastic polymer is a polyolefin, and wherein said polyolefin is polypropylene.

21. A process for producing a fiber or filament, which process comprises melt spinning (a) at least one fiber-forming thermoplastic polymer, and (b) at least one polybrominated anionic styrenic polymer, wherein the polybrominated anionic styrenic polymer has a bromine content of at least about 50 wt %, in proportions such that when the fiber-forming thermoplastic polymer is a polyester, the polybrominated anionic styrenic polymer is less than about 5 wt % of the fiber or filament, and when the fiber-forming thermoplastic polymer is a polyolefin, at least one synergist is present and the polybrominated anionic styrenic polymer is about 5 wt % or less of the fiber or filament.

22. A process as in claim 21 wherein said thermoplastic fiber-forming polymer and said polybrominated anionic styrenic polymer are simultaneously mixed and melted.

23. A process as in claim 21 wherein said fiber-forming thermoplastic polymer is a polyester, and wherein said polyester is polyethylene terephthalate, polybutylene terephthalate, or polytrimethylene terephthalate.

24. A process as in claim 21 wherein said fiber-forming thermoplastic polymer is a polyamide, and said polyamide is nylon-6 (polycaprolactam), nylon-6,6, nylon-6,12, nylon-12 (polylauryllactam), or a high temperature nylon.

25. A process as in claim 21 wherein said fiber-forming thermoplastic polymer is a polyolefin.

26. A process as in claim 25 wherein said polyolefin is polypropylene.

27. A process as in claim 21 wherein said bromine content of said polybrominated anionic styrenic polymer is at least about 60 wt %, and wherein said polybrominated anionic styrenic polymer is a brominated anionic polystyrene.

28. A process as in claim 21 wherein said fiber-forming thermoplastic polymer is a polyester, wherein said polyester is polyethylene terephthalate, polybutylene terephthalate, or polytrimethylene terephthalate, wherein said bromine content of said polybrominated anionic styrenic polymer is at least about 60 wt %, and wherein said polybrominated anionic styrenic polymer is a brominated anionic polystyrene.

29. A process as in claim 21 wherein said fiber-forming thermoplastic polymer is a polyolefin, wherein said polyolefin is polypropylene, wherein said bromine content of said polybrominated anionic styrenic polymer is at least about 60 wt %, and wherein said polybrominated anionic styrenic polymer is a brominated anionic polystyrene.

30. A process as in claim 21 wherein said polybrominated anionic styrenic polymer is brominated anionic polystyrene, and wherein the linear density of the produced fiber or filament is in the range of about 2 to about 25 denier.

31. A process as in claim 21 wherein said polybrominated anionic styrenic polymer has at least one of the following characteristics:
  (i) a thermal stability in the Thermal Stability Test of 200 ppm HBr or less;
  (ii) a chlorine content, if any, of less than about 700 ppm Cl;
  (iii) a TGA temperature for 1% weight loss which is 340° C. or higher;
  (iv) a ΔE color value, measured using 10 wt % solutions in chlorobenzene, of less than about 10;
  (v) a melt flow index in the Melt Flow Index Test of at least about 20 g/10 min; and/or
  (vi) a GPC weight average molecular weight in the range of about 8000 to about 20,000.

32. A process as in claim 31 wherein said bromine content of said polybrominated anionic styrenic polymer is at least about 60 wt %, and wherein said polybrominated anionic styrenic polymer is a brominated anionic polystyrene.

33. A process as in claim 32 wherein said fiber-forming thermoplastic polymer is a polyester, and wherein said polyester is polyethylene terephthalate, polybutylene terephthalate, or polytrimethylene terephthalate.

34. A process as in claim 32 wherein said fiber-forming thermoplastic polymer is a polyolefin, and wherein said polyolefin is polypropylene.

35. A process as in claim 21 wherein said polybrominated anionic styrenic polymer is produced by bromination of an anionic styrenic polymer, which anionic styrenic polymer is produced by a batch process, which process comprises charging a liquid saturated hydrocarbon diluent and an ether promoter into a reactor; and then A) (i) charging a saturated hydrocarbon solution of organolithium initiator into the reactor, in an amount to provide in the range of about 1 to about 10 mol % of organolithium initiator based on the total amount of a styrenic monomer to be added followed by (ii) the controlled addition of the styrenic monomer such that the temperature of the resultant reaction mixture is maintained at or below about 55° C., or B) concurrently feeding separate feeds of (i) a styrenic monomer and (ii) a saturated hydrocarbon solution of organolithium initiator into the reactor, the feeds being maintained at rates to provide for the addition of an amount of organolithium initiator in the range of about 1 to about 10 mol % based on the total amount of styrenic monomer to be added, the temperature of the resultant reaction mixture being maintained at or below about 55° C. and feed (ii) being of a shorter duration than feed (i).

36. A process as in claim 35 wherein said bromine content of said polybrominated anionic styrenic polymer is at least about 60 wt %, and wherein said polybrominated anionic styrenic polymer is a brominated anionic polystyrene.

37. A process as in claim 36 wherein said fiber-forming thermoplastic polymer is a polyester, and wherein said polyester is polyethylene terephthalate, polybutylene terephthalate, or polytrimethylene terephthalate.

38. A process as in claim 36 wherein said fiber-forming thermoplastic polymer is a polyolefin, and wherein said polyolefin is polypropylene.

* * * * *